(12) United States Patent
Jung et al.

(10) Patent No.: US 12,477,247 B2
(45) Date of Patent: Nov. 18, 2025

(54) IMAGE SENSOR

(71) Applicant: Samsung Electronics Co., Ltd., Suwon-si (KR)

(72) Inventors: Hyunyong Jung, Seoul (KR); Minwoong Seo, Hwaseong-si (KR); Myunglae Chu, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/432,385

(22) Filed: Feb. 5, 2024

(65) Prior Publication Data

US 2024/0179435 A1    May 30, 2024

Related U.S. Application Data

(62) Division of application No. 17/482,563, filed on Sep. 23, 2021, now Pat. No. 11,924,570.

(30) Foreign Application Priority Data

Dec. 10, 2020 (KR) .................. 10-2020-0172576

(51) Int. Cl.
*H04N 25/771* (2023.01)
*H04N 25/532* (2023.01)
*H04N 25/78* (2023.01)

(52) U.S. Cl.
CPC ......... *H04N 25/771* (2023.01); *H04N 25/532* (2023.01); *H04N 25/78* (2023.01)

(58) Field of Classification Search
CPC ...... H04N 25/771; H04N 25/53; H04N 25/75; H04N 25/532; H04N 25/616; H04N 25/78; H04N 25/59; H04N 25/583; H04N 25/766
See application file for complete search history.

(56) References Cited

U.S. PATENT DOCUMENTS

| | | | |
|---|---|---|---|
| 7,821,560 B2 | 10/2010 | Sugawa et al. | |
| 9,100,603 B2 | 8/2015 | Nishihara et al. | |
| 9,628,737 B2 | 4/2017 | Kato | |
| 9,781,278 B2 | 10/2017 | Miyoshi et al. | |
| 9,942,492 B2 | 4/2018 | Innocent et al. | |
| 10,154,222 B2 | 12/2018 | Sugawa et al. | |

(Continued)

FOREIGN PATENT DOCUMENTS

| | | |
|---|---|---|
| CN | 104333718 A | 2/2015 |
| JP | 4846076 B1 | 12/2011 |

*Primary Examiner* — Michael E Teitelbaum
(74) *Attorney, Agent, or Firm* — Harness, Dickey & Pierce, P.L.C.

(57) ABSTRACT

An image sensor includes a pixel array including a plurality of pixels; and processing circuitry, wherein each of the plurality of pixels includes: a photodiode; a floating diffusion node configured to integrate photocharge generated by the photodiode; a first capacitor configured to store charge corresponding to a voltage of the floating diffusion node which is reset; a first sampling transistor one terminal of which is connected to the second node, and another terminal of which is connected to the first capacitor, being configured to sample charge to the first capacitor; a second capacitor configured to store charge corresponding to the voltage of the floating diffusion node at which the photocharge has been integrated; and a second sampling transistor, one terminal of which is connected to the second node, and another terminal of which is connected to the second capacitor, being configured to sample charge to the second capacitor.

16 Claims, 17 Drawing Sheets

(56) References Cited

U.S. PATENT DOCUMENTS

| | | |
|---|---|---|
| 10,313,613 B2 | 6/2019 | Velichko |
| 10,368,019 B2 | 7/2019 | Otaka |
| 10,397,500 B1 | 8/2019 | Xu et al. |
| 10,567,689 B2 | 2/2020 | Velichko |
| 10,659,709 B2 | 5/2020 | Mori et al. |
| 10,741,592 B2 | 8/2020 | Innocent |
| 2009/0237538 A1 | 9/2009 | Masuyama et al. |
| 2017/0104946 A1 | 4/2017 | Hong |
| 2020/0204750 A1 | 6/2020 | Cremers |

IMAGE SENSOR

CROSS-REFERENCE TO RELATED APPLICATION

This application is a divisional of U.S. application Ser. No. 17/482,563, filed on Sep. 23, 2021, which claims priority under 35 U.S.C. § 119 to Korean Patent Application No. 10-2020-0172576, filed on Dec. 10, 2020 in the Korean Intellectual Property Office, the disclosure of which is incorporated by reference herein in its entirety.

BACKGROUND

At least some example embodiments of the inventive concepts relate to an image sensor, and more particularly, to an image sensor capable of supporting a movement of a global shutter method.

Image sensors that convert captured images to electrical signals are used not only in general consumer electronics, such as digital cameras, mobile phones, and portable camcorders, but also cameras mounted on automobiles, security devices, and robots.

An image sensor may adjust the amount of photocharge that is to be a basis of an electrical signal by adjusting an exposure time. The image sensor may adjust an exposure time by using a rolling shutter method and a global shutter method. The rolling shutter method is a method of differently controlling an integration time of the photocharge of each row of a pixel array, and the global shutter method is a method of identically controlling the integration time of the photocharge of different rows from each other of the pixel array.

SUMMARY

At least some example embodiments of the inventive concepts provide an image sensor generating a pixel signal by using a plurality of capacitors connected to an output node.

An image sensor includes a pixel array in which a plurality of pixels are arranged and processing circuitry, wherein each of the plurality of pixels includes: a photodiode; a floating diffusion node configured to integrate photocharge generated by the photodiode; a first source follower configured to amplify and output a voltage of the floating diffusion node to a first node; a first pre-charge select transistor, one terminal of which is connected to the first node and another terminal of which is connected to a second node; a first capacitor configured to store charge corresponding to a voltage of the floating diffusion node which is reset; a first sampling transistor, one terminal of which is connected to the second node, and another terminal of which is connected to the first capacitor, the first sampling transistor being configured to sample charge to the first capacitor; a second capacitor configured to store charge corresponding to the voltage of the floating diffusion node at which the photocharge has been integrated; and a second sampling transistor, one terminal of which is connected to the second node, and another terminal of which is connected to the second capacitor, the second sampling transistor being configured to sample charge to the second capacitor, wherein the processing circuitry is configured to turn on the first sampling transistor during a first period and a third period such that the first sampling transistor outputs charge stored in the first capacitor as a pixel signal, and wherein the processing circuitry is further configured to turn on the second sampling transistor during a second period and the third period such that the second sampling transistor outputs charge stored in the second capacitor as the pixel signal.

An image sensor includes a pixel array in which a plurality of pixels are arranged; and processing circuitry, wherein each of the plurality of pixels includes: a photodiode; a floating diffusion node configured to integrate photocharge generated by the photodiode; a reset transistor configured to reset the floating diffusion node; a first source follower configured to amplify and output a voltage of the floating diffusion node to a first node; a first pre-charge select transistor configured to transmit the amplified voltage to an output node; a first capacitor; a second capacitor; a first sampling transistor, one terminal of which is connected to the first capacitor, and another terminal of which is connected to the output node, the first sampling transistor being configured to transmit the amplified voltage to the first capacitor; and a second sampling transistor, one terminal of which is connected to the second capacitor, and another terminal of which is connected to the output node, the second sampling transistor being configured to transmit the amplified voltage to the second capacitor, wherein the processing circuitry is configured to turn on the first sampling transistor and the second sampling transistor, such that the first and second sampling transistors operate during a first period and charge stored in the first capacitor and the second capacitor is output as a pixel signal.

An image sensor includes a pixel array in which a plurality of pixels are arranged and a row driver circuit configured to control the pixel array, wherein each of the plurality of pixels includes: a photodiode; a floating diffusion node configured to integrate photocharge generated by the photodiode; a floating diffusion node configured to integrate photocharge generated by the photodiode; a first sampling transistor configured to sample charge at the floating diffusion node, in response to the floating diffusion node being reset; a first capacitor connected to the first sampling transistor and configured to store photocharge sampled by the first sampling transistor; a second sampling transistor configured to sample an integrated charge of the floating diffusion node, in response to the floating diffusion node integrating the photocharge generated by the photodiode; and a second capacitor connected to the second sampling transistor and configured to store photocharge sampled by the second sampling transistor, wherein the row driver circuit is configured to, during a first period, turn on and control the first sampling transistor to output charge stored in the first capacitor as a first pixel signal, during a second period, turn on and control the second sampling transistor to output charge stored in the second capacitor as a second pixel signal, and during a third period, turn on and control the first sampling transistor and the second sampling transistor to output charge stored in the first capacitor and the second capacitor as the second pixel signal.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
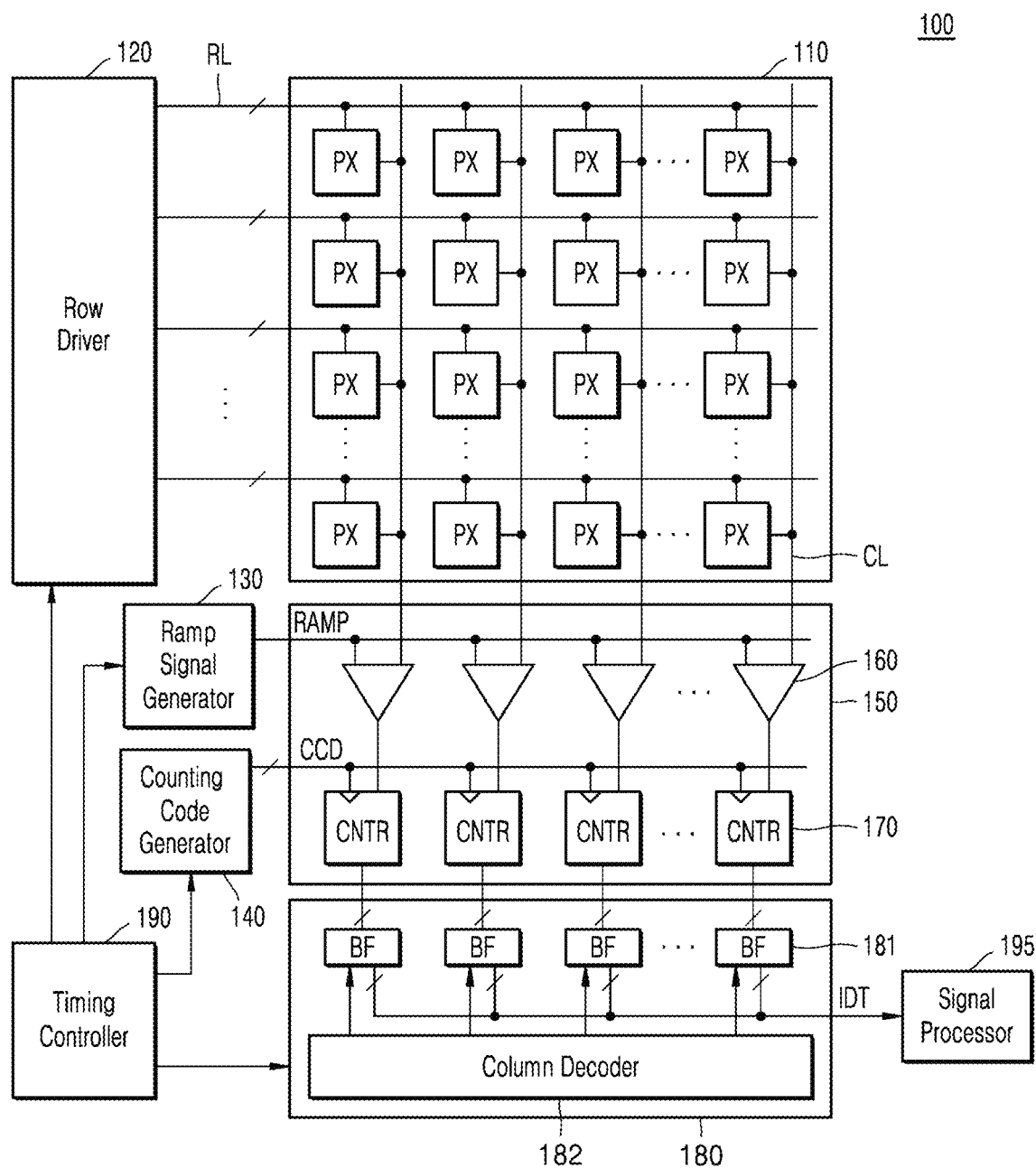
FIG. 1 is a block diagram of an image sensor, according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of an image sensor, according to at least one example embodiment of the inventive concepts.

An image sensor 100 may be mounted on an electronic device having an image or light sensing function. For example, the image sensor 100 may be mounted on an electronic device such as a camera, a smartphone, a wearable device, an Internet of Things (IoT) device, a personal computer (PC), a personal digital assistant (PDA), a portable multimedia player (PMP), and a navigation device. In addition, the image sensor 100 may be mounted on an electronic device to be provided as a component of vehicles, furniture, manufacturing equipment, doors, various measuring devices, etc.

Referring to FIG. 1, the image sensor 100 may include a pixel array 110, a row driver 120, a ramp signal generator 130, a counting code generator 140, an analog-to-digital conversion circuit 150 (hereinafter, referred to as an ADC circuit), a data output circuit 180, and a timing controller 190. The image sensor 100 may further include a signal processor 195. A configuration including the ADC circuit 150 and the data output circuit 180 may be referred to as a read-out circuit. The image sensor may further include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. For example, each of the row driver 120, ramp signal generator 130, counting code generator 140, timing controller 190, and signal processor 195 may be included in and/or embodied by the processing circuitry. The row driver 120, ramp signal generator 130, counting code generator 140, and timing controller 190 may also be referred to, in the present specification, as the row driver circuit 120, ramp signal generator circuit 130, counting code generator circuit 140, and timing controller circuit 190. According to at least some example embodiments, any operation descried in the present specification as being performed by an image sensor (e.g., image sensor 100) or an element thereof (e.g., pixel array 110, row driver 120, ramp signal generator 130, counting code generator 140, ADC circuit 150, timing controller 190, and/or signal processor 195) may be performed and/or controlled by the processing circuitry.

The pixel array 110 may be connected to a plurality of row lines RL and a plurality of column lines CL, and may include a plurality of pixels PX arranged in an array. The plurality of pixels PX may include active pixel sensors (APSs).

Each of the plurality of pixels PX may include at least one photoelectric conversion element, and the pixel PX may detect light by using the photoelectric conversion element, and output image signals that are electrical signals according to sensed light. For example, the photoelectric conversion element may include a photodiode, a phototransistor, a photogate, or a pinned photodiode, etc.

Each of the plurality of pixels PX may detect light in a certain spectral range. For example, the plurality of pixels PX may include red pixels PX converting light in a red spectral region into an electric signal, green pixels PX converting light in a green spectral range into an electric signal, and blue pixels PX converting light in a blue spectral range into an electric signal. However, the embodiment is not limited thereto, and the plurality of pixels PX may further include white pixels PX. As another example, the plurality of pixels PX may include pixels PX combined with another color configuration, for example, yellow pixels PX, cyan pixels PX, and magenta pixels PX.

A color filter array for transmitting light in a particular spectral region may be arranged on the plurality of pixels PX, and a color that a corresponding pixel detects according to a color filter arranged on each of the plurality of pixels PX may be determined. However, the embodiment is not limited thereto. In some embodiments, a particular photoelectric conversion element may convert light in a particular wavelength band into an electrical signal according to a level of the electrical signal applied to the photoelectric conversion element.

In some embodiments, each of the plurality of pixels PX may have a dual conversion gain. The dual conversion gain may include a low conversion gain and a high conversion gain. In this case, the conversion gain may be referred to as a ratio in which charge integrated in a floating diffusion node (FD in FIG. 3) is converted to a voltage. The charge generated by the photoelectric conversion element may be transmitted and integrated in the floating diffusion node FD, and the charge integrated in the floating diffusion node FD may be converted to a voltage according to the conversion gain. In this case, the conversion gain may vary according to capacitance of the floating diffusion node FD, and when the capacitance thereof is increased, the conversion gain may be decreased, and when the capacitance thereof is decreased, the conversion gain may be increased.

The row driver 120 may drive the pixel array 110 in units of rows. The row driver 120 may decode a row control signal (for example, an address signal) generated by the timing controller 190, and in response to the decoded row control signal, may select at least any one row line of the row lines constituting the pixel array 110. For example, the row driver 120 may generate a select signal selecting one of a plurality of rows. In addition, the pixel array 110 may output a pixel signal, for example, a pixel voltage, from a row selected by the select signal provided by the row driver 120. The pixel signal may include a reset signal and an image signal. The row driver 120 may transmit control signals for outputting the pixel signal to the pixel array 110, and the pixel PX may output the pixel signal by operating in response to the control signals.

The ramp signal generator 130 may generate a ramp signal (for example, a ramp voltage) in which a level is raised or lowered at a certain slope according to the control of the timing controller 190. A ramp signal RAMP may be provided to each of a plurality of correlated double sampling (CDS) circuits 160 provided in the ADC circuit 150.

The counting code generator 140 may generate a counting code CCD according to the control of the timing controller 190. The counting code CCD may be provided to each of the plurality of counter circuits (CNTR) 170. In some embodiments, the counting code generator 140 may be implemented as a gray code generator. The counting code generator 140 may generate a plurality of code values having a resolution according to a set number of bits as the counting code CCD. For example, when a 10-bit code is set, the counting code generator 140 may generate a counting code CCD including 1024 code values that sequentially increase or decrease.

The ADC circuit 150 may include the CDS circuits 160 and the plurality of CNTRs 170. The ADC circuit 150 may convert the pixel signal (for example, the pixel voltage) input from the pixel array 110 to the pixel value, which is a digital signal. Each pixel signal received via each of the plurality of column lines CL may be converted to the pixel value, which is the digital signal, by the CDS circuit 160 and the CNTR 170.

The CDS circuit 160 may compare the pixel signal, for example, the pixel voltage, received via the column line CL, to the ramp signal RAMP, and output the comparison result as a comparison signal. The CDS circuit 160 may, when a level of the ramp signal RAMP is the same as a level of the pixel signal, output the comparison signal that is transitioned from a first level (for example, logic high) to a second level (for example, logic low). A time point at which a level of the comparison signal is transitioned may be determined according to the level of the pixel signal.

The CDS circuit 160 may sample the pixel signal provided by the pixel PX according to a CDS method. The CDS circuit 160 may sample the reset signal received as the pixel signal and generate a comparison signal according to the reset signal by comparing the reset signal to the ramp signal RAMP. Thereafter, the CDS circuit 160 may sample the image signal correlated with the reset signal, and generate the comparison signal according to the image signal by comparing the image signal to the ramp signal RAMP.

The CNTR 170 may count the number of level transition points of the comparison signal output by the CDS circuit 150, and output a count value. In some embodiments, the CNTR 170 may include a latch circuit and an arithmetic circuit. The latch circuit may receive the counting code CCD from the counting code generator 140 and the comparison signal from the CDS circuit 160, and latch the code value of the counting code CCD at a time point when the level of the comparison signal is transitioned. The latch circuit may separately latch the code value corresponding to the reset signal, for example, a reset value, and the code value corresponding to the image signal, for example, an image signal value. An operation circuit may calculate the reset value and the image signal value, and generate the image signal value in which a reset level of the pixel PX has been removed. The CNTR 170 may output the image signal value in which the reset level has been removed as the pixel value.

In the embodiment, it is described that the image sensor 100 includes the counting code generator 140, and the CNTR 170 includes a circuit that latches the code value of the counting code CCD received from the counting code generator 140, but the embodiment is not limited thereto. In some embodiments, the image sensor 100 may not separately include the counting code generator 140, and the CNTR 170 may be implemented with an up-counter in which the count value is increased sequentially, the operation circuit, or an up/down counter, or a bit-wise inversion counter based on a counting clock signal provided by the timing controller 190.

The data output circuit 180 may temporarily store the pixel value output by the ADC circuit 150 and output the stored pixel value. The data output circuit 180 may include a plurality of column memories 181, and a column decoder 182. The column memory 181 may store the pixel values received from the CNTR 170. In some embodiments, each of the plurality of column memories 181 may be provided in the CNTR 170. A plurality of pixel values stored in the plurality of column memories 181 may be output as image data IDT under the control of the column memory 181.

The timing controller 190 may output the control signal to each of the row driver 120, the ramp signal generator 130, the counting code generator 140, the ADC circuit 150, and the data output circuit 180, and may control operations or timings of the row driver 120, the ramp signal generator 130, the counting code generator 140, the ADC circuit 150, and the data output circuit 180.

The signal processor 195 may perform on the image data a noise reduction process, a gain adjustment process, a waveform shaping process, an interpolation process, a white balance process, a gamma process, an edge emphasization process, a binning process, etc. According to at least one example embodiment of the inventive concepts, the signal processor 195 may be included in an external processor outside the image sensor 100.

Figure 2:
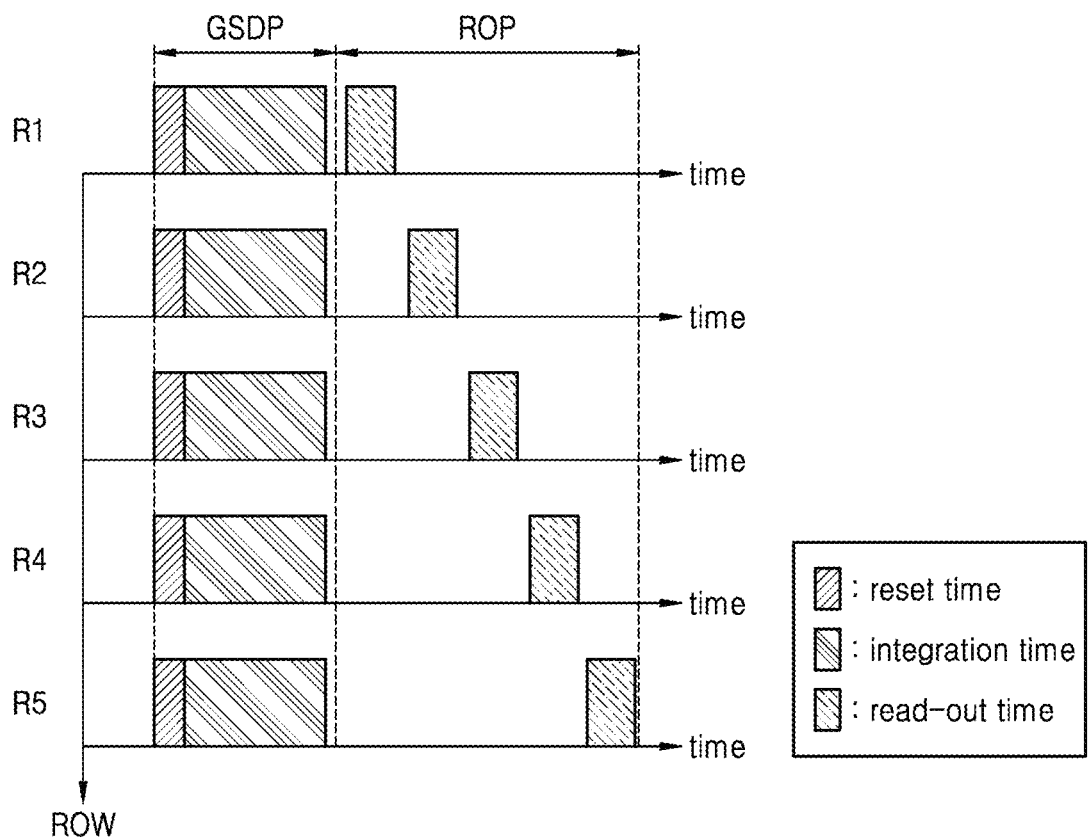
FIG. 2 is a diagram for describing an operation of a global shutter mode of the image sensor, according to at least one example embodiment of the inventive concepts.

FIG. 2 is a diagram for describing an operation of a global shutter mode of the image sensor 100, according to at least one example embodiment of the inventive concepts.

Referring to FIGS. 1 and 2, the image sensor 100 may be driven in a global shutter mode. In some embodiments, the image sensor 100 may perform a global signal dumping operation performed during a global signal dumping period GSDP, and a read-out operation performed during a read-out period ROP.

The global signal dumping operation may include a reset operation resetting charge integrated at a floating diffusion node during a reset time, and an integration operation integrating photocharge that has been generated by the photoelectric conversion element during an integration time. The global signal dumping operation may be performed simultaneously on all rows of the pixel array 110. For example, referring to FIG. 2, the global signal dumping operation may be performed simultaneously on first through fifth rows R1 through R5 of the pixel array 110.

In the read-out period ROP, a rolling read-out operation may be performed in which the read-out operation performed during a read-out time is performed sequentially by row. For example, referring to FIG. 2, after the read-out operation on the first row R1 of the pixel array 110 is performed, the read-out operation on the second row R2, which is the next sequence, may be performed. Then, after the read-out operation on the second row R2 is performed, the read-out operation on the third row R3, which is the next sequence, may be performed. In some embodiments, during the read-out operation, the reset signal corresponding to the reset operation or the image signal corresponding to the integration operation may be output from the pixels PX.

The image sensor 100 according to at least some example embodiments of the inventive concepts may, by operating in the global shutter mode, control identically integration time points of the pixels PX arranged on different rows from each other, and remove distortion of image due to difference between the integration times. However, the image sensor 100 according to at least some example embodiments of the inventive concepts may drive in the rolling shutter mode as an operation mode is changed. When driving in the rolling shutter mode, the image sensor 100 may control the integration time to be different by row of the pixel array 110. In some embodiments, the integration time may be the same for all rows, or may be the same for rows of a certain group.

Figure 3:
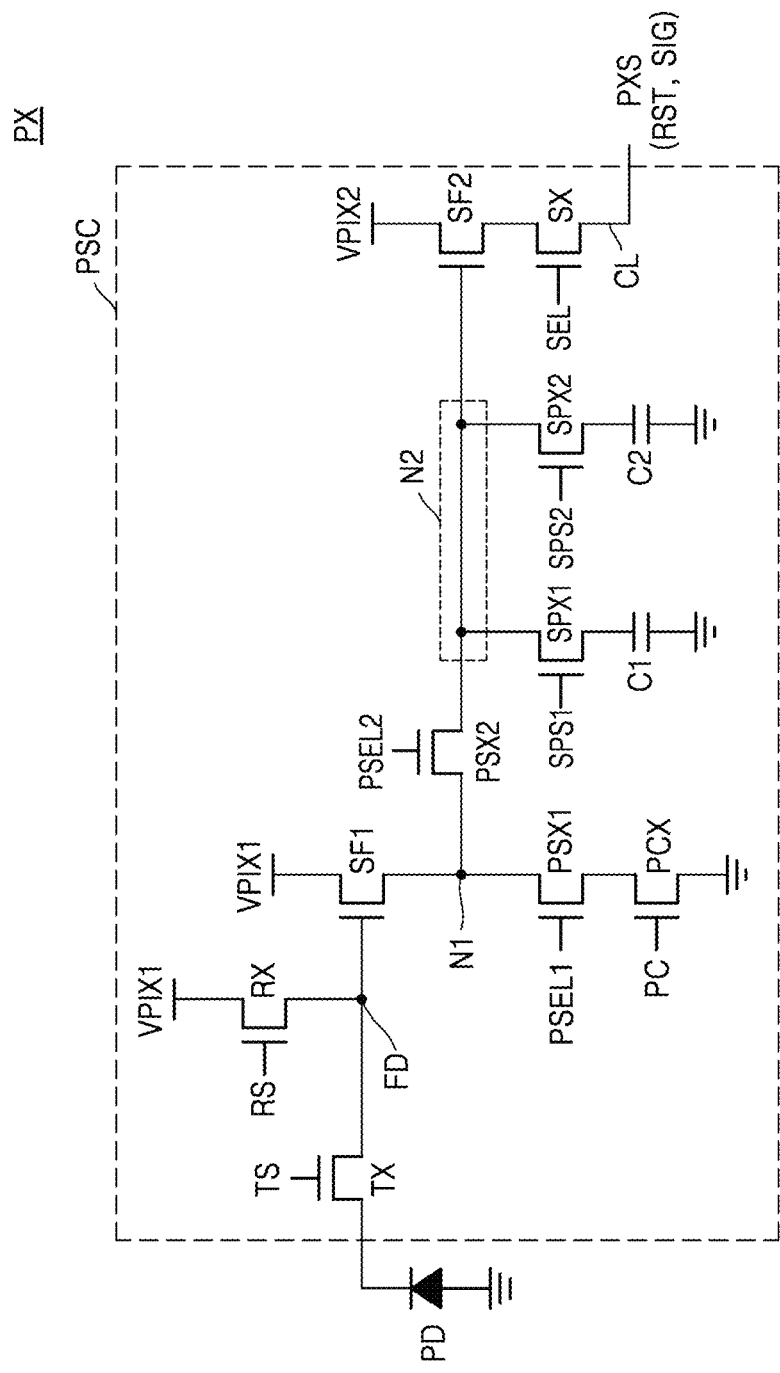
FIG. 3 is a circuit diagram of the pixel, according to at least one example embodiment of the inventive concepts.

FIG. 3 is a circuit diagram of the pixel PX, according to at least one example embodiment of the inventive concepts. FIG. 3 is a circuit diagram of the pixel PX in FIG. 1, according to at least one example embodiment of the inventive concepts.

Referring to FIG. 3, the pixel PX may include the photodiode PD, and a pixel signal generating circuit PSC for generating a pixel signal PXS. Control signals, such as TS, RS, PSEL1, PSEL2, PC, SPS1, SPS2, and SEL, may be applied to the pixel signal generating circuit PSC, and at least some of the control signals may be generated by the row driver 120.

The photodiode PD may generate photocharge that varies according to intensity of light. For example, the photodiode PD may generate charges, that is, electrons of negative charge and holes of positive charge, in proportion to the amount of incident light.

The pixel signal generating circuit PSC may include a plurality of transistors, such as TX, RX, SF1, PSX1, PSX2, PCX, SPX1, SPX2, SF2, and SX, a first capacitor C1, and a second capacitor C2. In the first capacitor C1 and the second capacitor C2, the charge according to the reset operation may be integrated, or the charge according to a photocharge integration operation may be integrated.

The pixel signal generating circuit PSC may include a transmit transistor TX. The transmit transistor TX may be connected between the photodiode PD and the floating diffusion node FD. A first terminal of the transmit transistor TX may be connected to an output terminal of the photodiode PD, and a second terminal of the transmit transistor TX may be connected to the floating diffusion node FD. The transmit transistor TX may be turned on or off in response to a transmit control signal TS received from the row driver 120, and may transmit the photocharge generated by the photodiode PD to the floating diffusion node FD.

The pixel signal generating circuit PSC may include a reset transistor RX. The reset transistor RX may reset the charge integrated at the floating diffusion node FD. A first pixel voltage VPIX1 may be applied to a first terminal of the reset transistor RX, and a second terminal of the reset transistor RX may be connected to the floating diffusion node FD. The reset transistor RX may be turned on or off in response to a reset control signal RS received from the row driver 120, and the charge integrated at the floating diffusion node FD may be discharged, and the floating diffusion node FD may be reset.

The pixel signal generating circuit PSC may include a first source follower SF1. A first pixel voltage VPIX1 may be applied to a first terminal of the first source follower SF1, and a second terminal of the first source follower SF1 may be connected to a first output node N1. The first source follower SF1 may, as a buffer amplifier, buffer a signal according to the charge amount integrated at the floating diffusion node FD. The potential of the floating diffusion node FD may be changed according to the amount of charge integrated at the floating diffusion node FD, and the first source follower SF1 may amplify a potential change at the floating diffusion node FD and output the amplified potential change to the first output node N1.

The pixel signal generating circuit PSC may include a first pre-charge select transistor PSX1 for resetting the first output node N1. For example, the pixel signal generating circuit PSC may include the first pre-charge select transistor PSX1. A first terminal of the first pre-charge select transistor PSX1 may be connected to the first output node N1, and a second terminal of the first pre-charge select transistor PSX1 may be connected to a pre-charge transistor PCX. The first pre-charge select transistor PSX1 may be turned on or off in response to a first pre-charge select control signal PSEL1 received from the row driver 120, and may reset the first output node N1.

In some embodiments, the pixel signal generating circuit PSC may include a plurality of pre-charge select transistors for resetting the first output node N1. For example, the pixel signal generating circuit PSC may further include a second pre-charge select transistor PSX2 in addition to the first pre-charge select transistor PSX1. A first terminal of the second pre-charge select transistor PSX2 may be connected to the first output node N1, and a second terminal of the second pre-charge select transistor PSX2 may be connected to a second output node N2. The second pre-charge select transistor PSX2 may be turned on or off in response to a second pre-charge select control signal PSEL2 received from the row driver 120, and may reset the first output node N1 and the second output node N2.

In FIG. 3, the pixel PX is illustrated to include two pre-charge select transistors, that is, PSX1 and PSX2, but the embodiment is not limited thereto. The pixel PX may, as a transistor for resetting the first output node N1, include various number of pre-charge select transistors.

The pixel signal generating circuit PSC may include the pre-charge transistor PCX. A first terminal of the pre-charge transistor PCX may be connected to the first pre-charge select transistor PSX1, and a ground voltage may be applied to a second terminal thereof. The pre-charge transistor PCX may operate as a current source according to a pre-charge control signal PC received from the row driver 120, and may pre-charge the first output node N1.

The pixel signal generating circuit PSC may include a first sampling transistor SPX1. A first terminal of the first sampling transistor SPX1 may be connected to the second output node N2, and a second terminal of the first sampling transistor SPX1 may be connected to the first capacitor C1. In response to a first sampling control signal SPS1 received from the row driver 120, the first sampling transistor SPX1 may be turned on or off, and may connect the first capacitor C1 to the second output node N2.

The ground voltage may be applied to a first terminal of the first capacitor C1, and a second terminal of the first capacitor C1 may be connected to the first sampling transistor SPX1. The charge may be integrated in the first capacitor C1 according to a switching operation of the first sampling transistor SPX1. For example, the charge according to the reset operation in which the floating diffusion node FD is reset may be integrated in the first capacitor C1. In FIG. 3, it is illustrated that the ground voltage is applied to the first capacitor C1, but according to the embodiment, the first pixel voltage VPIX1 may be applied to the first capacitor C1.

The pixel signal generating circuit PSC may include a second sampling transistor SPX2. A first terminal of the second sampling transistor SPX2 may be connected to the second output node N2, and a second terminal of the second sampling transistor SPX2 may be connected to the second capacitor C2. The second sampling transistor SPX2 may be turned on or off in response to a second sampling control signal SPS2 received from the row driver 120, and may connect the second capacitor C2 to the second output node N2.

The ground voltage may be applied to a first terminal of the second capacitor C2, and a second terminal of the second capacitor C2 may be connected to the second sampling transistor SPX2. The charge may be integrated in the second capacitor C2 according to a switching operation of the second sampling transistor SPX2. For example, the charge according to the photocharge integration operation in which the photocharges generated by the photodiode PD are integrated may be integrated. In FIG. 3, it is illustrated that the ground voltage is applied to the second capacitor C2, but according to the embodiment, the first pixel voltage VPIX1 may be applied to the second capacitor C2.

The pixel signal generating circuit PSC may include a second source follower SF2 and the select transistor SX. A second pixel voltage VPIX2 may be applied to a first terminal of the second source follower SF2, and a second terminal of the second source follower SF2 may be connected to the select transistor SX. The second source follower SF2 may amplify and output a potential change at the second output node N2. In some embodiments, the second pixel voltage VPIX2 applied to the second source follower SF2 may be less than or equal to the first pixel voltage VPIX1.

A first terminal of the select transistor SX may be connected to the second source follower SF2, and a second terminal of the select transistor SX may be connected to the column line CL. The select transistor SX may be on or off in response to a select control signal SELS received from the row driver 120. When the select transistor SX is turned on in the read-out operation, the pixel signal PXS including a reset signal RST corresponding to the reset operation or an image signal SIG corresponding to a charge integration operation may be output to the column line CL.

For example, when the first sampling transistor SPX1 is turned on while the select transistor SX has been turned on and operating, and the second sampling transistor SPX2 is turned off, the reset signal RST corresponding to the charge integrated in the first capacitor C1 may be output. In addition, when the second sampling transistor SPX2 is turned on while the select transistor SX has been turned on and operating, and the first sampling transistor SPX1 is turned off, the image signal SIG corresponding to the charge integrated in the second capacitor C2 may be output.

The image sensor 100 at least some example embodiments of the inventive concepts may additionally output the image signal SIG. After a first image signal corresponding to the charge integrated in the second capacitor C2 in the above-described method is output, a second image signal corresponding to the charge integrated in the first capacitor C1 and the second capacitor C2 may be additionally output.

For example, when the first sampling transistor SPX1 and the second sampling transistor SPX2 are all turned on and operating while the select transistor SX has been turned on and operating, the second image signal corresponding to the charge integrated in the first capacitor C1 and the second capacitor C2 may be output. When the first sampling transistor SPX1 and the second sampling transistor SPX2 are all turned on and operating, the first capacitor C1 may be connected to the second capacitor C2 in parallel, and the capacitance may be increased. Accordingly, when compared to the first image signal, a voltage of the second image signal may be reduced according to the reduction in the conversion gain.

The first image signal and the second image signal read in the above-described method may be selectively used for generating the image data IDT according to a plurality of modes. For example, the processing circuitry may be set to a first mode when a low illuminance state is detected, and the first image signal may be used in the first mode. In addition, the processing circuitry may be set to a second mode when a high illuminance state is detected, and the second image signal may be used in the second mode. A detailed method of generating the first image signal and the second image signal will be described later with reference to FIGS. 7 and 8.

Figure 4:
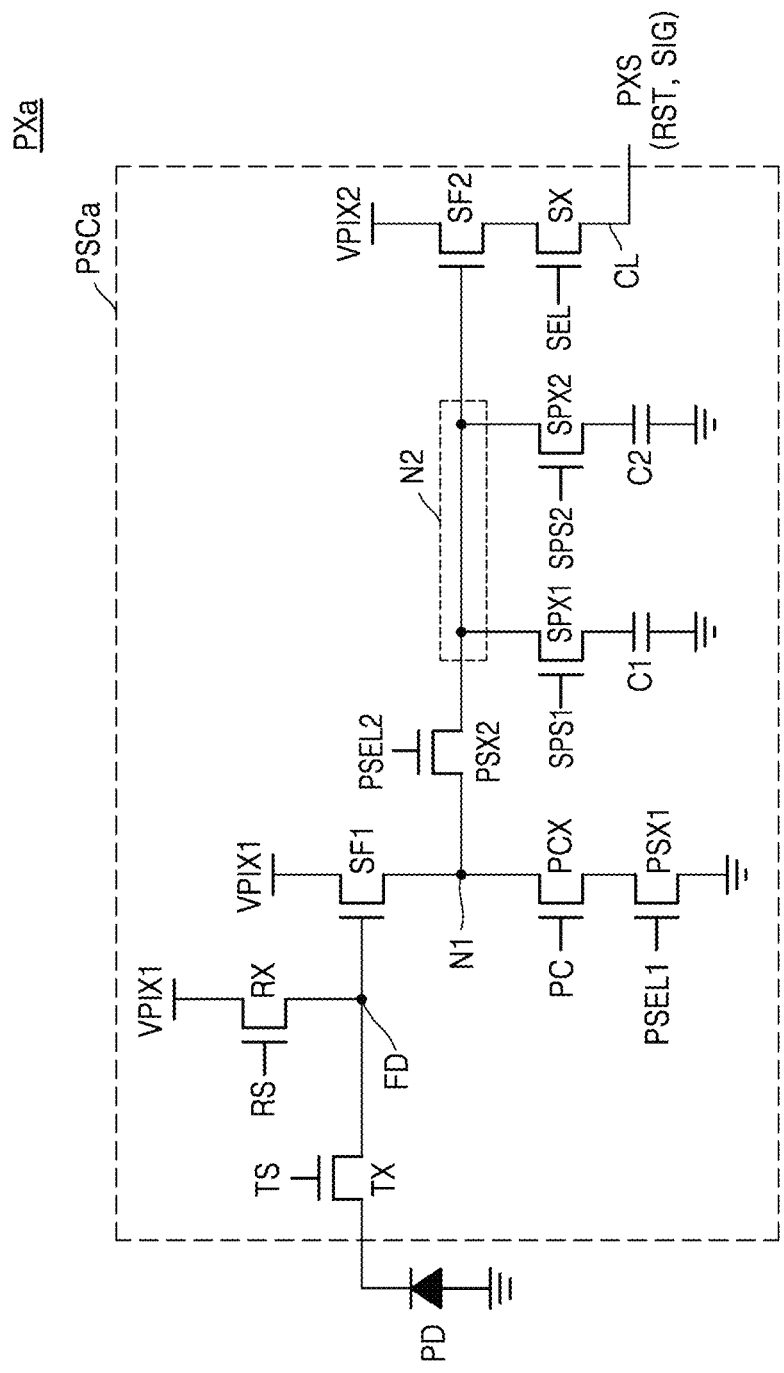
FIG. 4 is a circuit diagram of a pixel, according to at least one example embodiment of the inventive concepts.

FIG. 4 is a circuit diagram of a pixel PXa, according to at least one example embodiment of the inventive concepts. FIG. 4 is a diagram illustrating a modifiable embodiment of the pixel PX of FIG. 3. In the descriptions with reference to FIG. 4, duplicate descriptions with reference to FIG. 3 are omitted.

Referring to FIG. 4, the pixel PXa may include a photodiode PD, and a pixel signal generating circuit PSCa for generating the pixel signal PXS. Control signals, such as TS, RS, PSEL1, PSEL2, PC, SPS1, SPS2, and SEL, may be applied to the pixel signal generating circuit PSCa, and at least some of the control signals may be generated by the row driver 120.

The pixel signal generating circuit PSCa may include a plurality of transistors, such as TX, RX, SF1, PSX1, PSX2, PCX, SPX1, SPX2, SF2, and SX, a first capacitor C1, and a second capacitor C2. In the first capacitor C1 and the second capacitor C2, the charge according to the reset operation may be integrated, or the charge according to a photocharge integration operation may be integrated.

Comparing the pixel signal generating circuit PSC in FIG. 3 to the pixel signal generating circuit PSCa in FIG. 4, in the pixel signal generating circuit PSCa in FIG. 4, the first terminal of the pre-charge transistor PCX may be connected to the first output node N1, and the second terminal thereof may be connected to the first pre-charge select transistor PSX1. In addition, the first terminal of the first pre-charge select transistor PSX1 may be connected to the pre-charge transistor PCX, and the ground voltage may be applied to the second terminal thereof. In other words, arrangements of the pre-charge transistor PCX and the first pre-charge select transistor PSX1 may be changed with each other.

Figure 5:
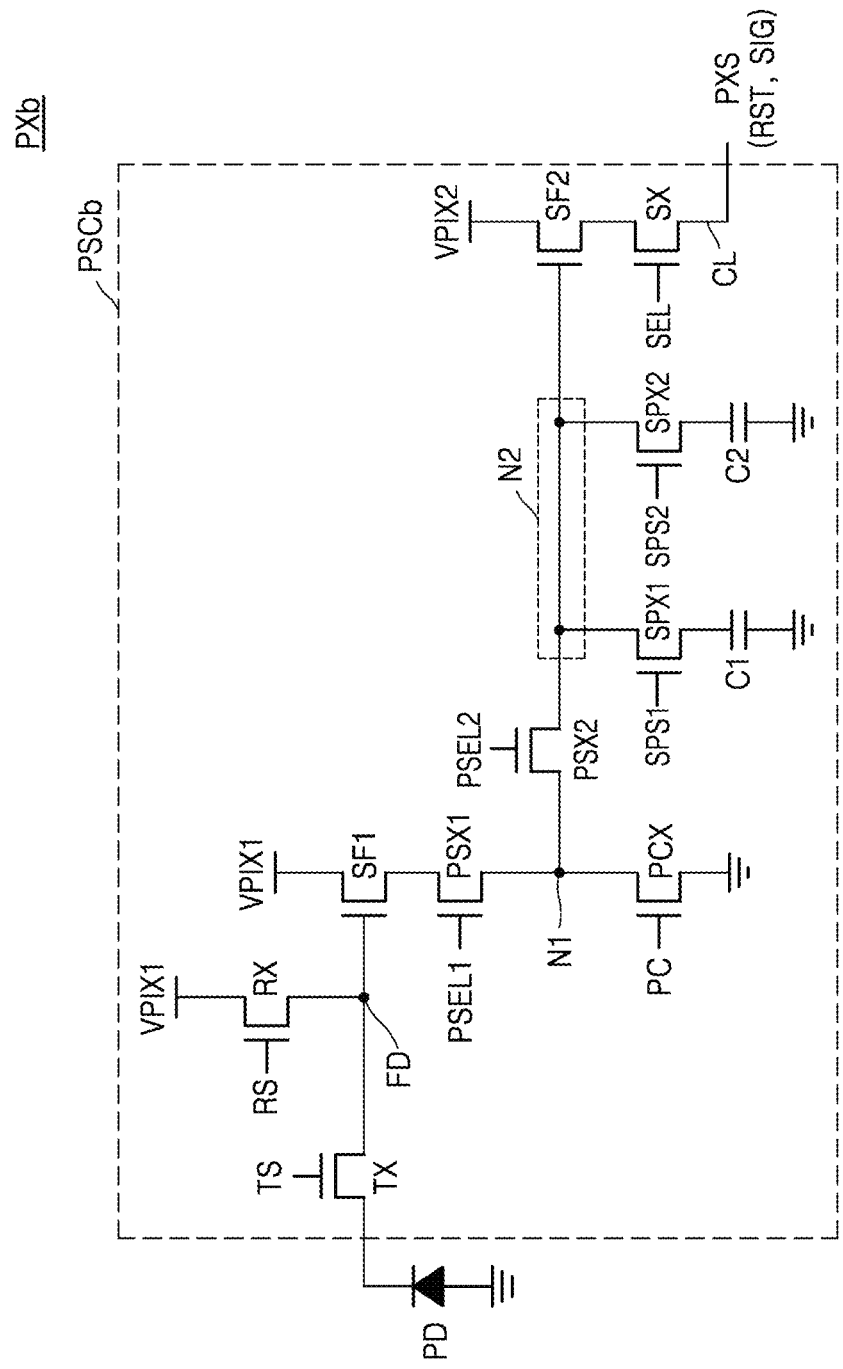
FIG. 5 is a circuit diagram of a pixel, according to at least one example embodiment of the inventive concepts.

FIG. 5 is a circuit diagram of a pixel PXb, according to at least one example embodiment of the inventive concepts. FIG. 5 is a diagram illustrating a modifiable embodiment of the pixel PX of FIG. 3. In the descriptions with reference to FIG. 5, duplicate descriptions with reference to FIG. 3 are omitted.

Referring to FIG. 5, the pixel PXb may include the photodiode PD, and a pixel signal generating circuit PSCb for generating the pixel signal PXS. Control signals, such as TS, RS, PSEL1, PSEL2, PC, SPS1, SPS2, and SEL, may be applied to the pixel signal generating circuit PSCb, and at least some of the control signals may be generated by the row driver 120. The pixel signal generating circuit PSCb may include a plurality of transistors, such as TX, RX, SF1, PSX1, PSX2, PCX, SPX1, SPX2, SF2, and SX, a first capacitor C1, and a second capacitor C2.

Comparing the pixel signal generating circuit PSC in FIG. 3 to the pixel signal generating circuit PSCb in FIG. 5, in the pixel signal generating circuit PSCb in FIG. 5, the first output node N1 may be arranged between the first pre-charge select transistor PSX1 and the pre-charge transistor PCX. In addition, the first output node N1 in the pixel signal generating circuit PSCb in FIG. 5 may, like the first output node N1 of the pixel signal generating circuit PSC in FIG. 3, be connected to the second pre-charge select transistor PSX2.

Figure 6:
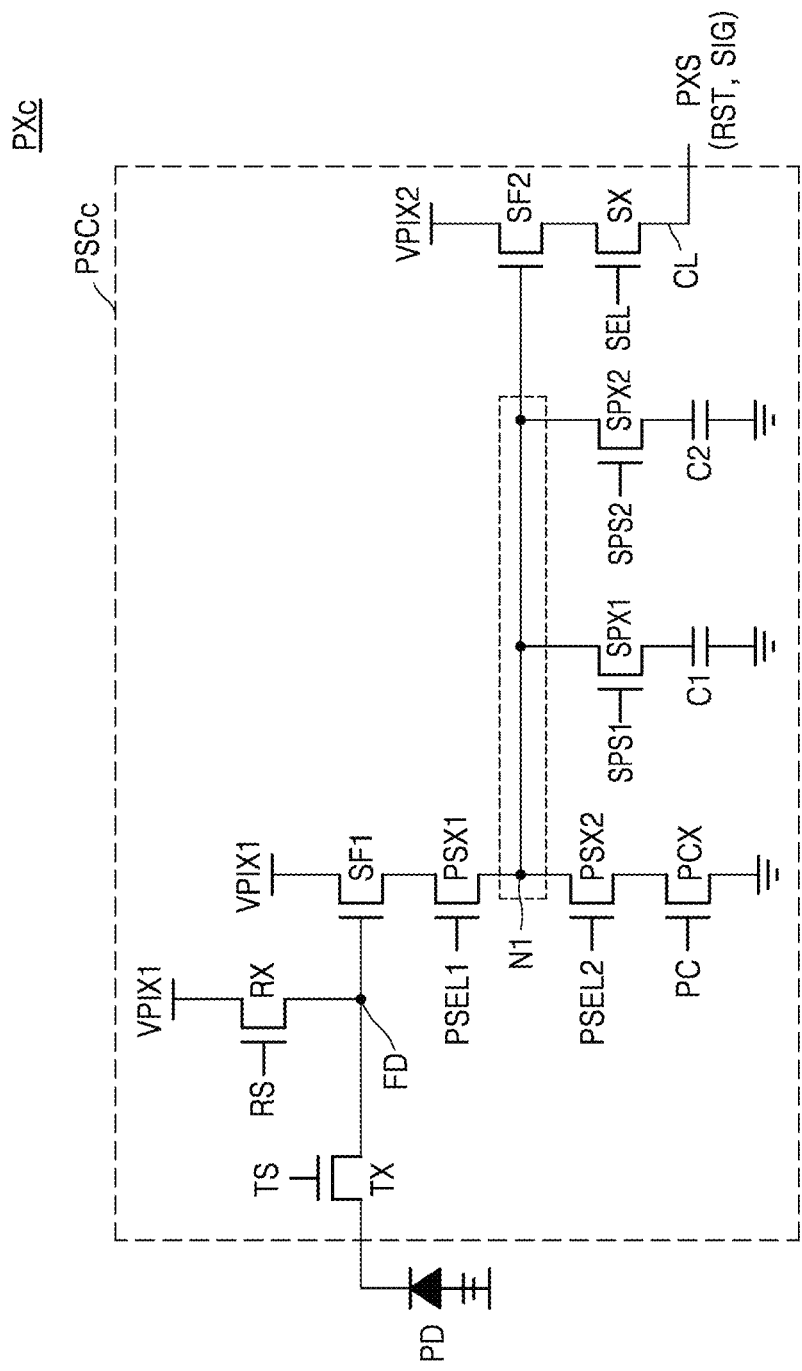
FIG. 6 is a circuit diagram of a pixel, according to at least one example embodiment of the inventive concepts.

FIG. 6 is a circuit diagram of a pixel PXc, according to at least one example embodiment of the inventive concepts. FIG. 6 is a diagram illustrating a modifiable embodiment of the pixel PX of FIG. 3. In the descriptions with reference to FIG. 6, duplicate descriptions with reference to FIG. 3 are omitted.

Referring to FIG. 6, the pixel PXc may include the photodiode PD, and a pixel signal generating circuit PSCc for generating the pixel signal PXS. Control signals, such as TS, RS, PSEL1, PSEL2, PC, SPS1, SPS2, and SEL, may be applied to the pixel signal generating circuit PSCc, and at least some of the control signals may be generated by the row driver 120. The pixel signal generating circuit PSCc may include a plurality of transistors, such as TX, RX, SF1, PSX1, PSX2, PCX, SPX1, SPX2, SF2, and SX, a first capacitor C1, and a second capacitor C2.

Comparing the pixel signal generating circuit PSC in FIG. 3 to the pixel signal generating circuit PSCc in FIG. 6, in the pixel signal generating circuit PSCc in FIG. 6, the second pre-charge select transistor PSX2 may be connected between the first pre-charge select transistor PSX1 and the pre-charge transistor PCX. In other words, referring to FIG. 6, the first terminal of the second pre-charge select transistor PSX2 may be connected to the first output node N1, and the second terminal of the second pre-charge select transistor PSX2 may be connected to the pre-charge transistor PCX.

In addition, the first sampling transistor SPX1 and the second sampling transistor SPX2 may be connected to the first output node N1. The first terminal of the first sampling transistor SPX1 may be connected to the first output node N1, and the second terminal of the first sampling transistor SPX1 may be connected to the first capacitor C1. The first terminal of the second sampling transistor SPX2 may be connected to the first output node N1, and the second terminal of the second sampling transistor SPX2 may be connected to the second capacitor C2.

Figure 7:
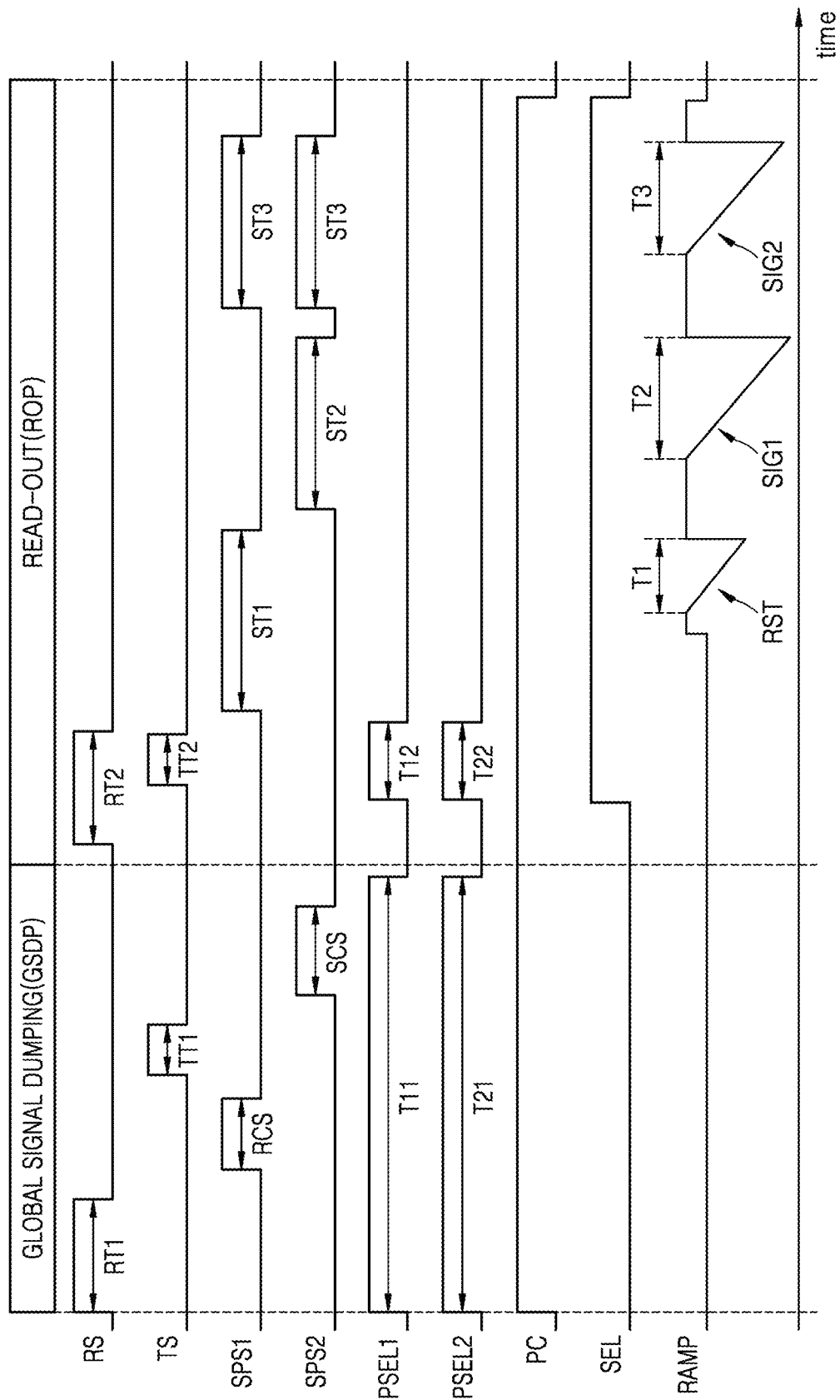
FIG. 7 is a timing diagram illustrating control signals and ramp signals provided to a pixel, according to at least one example embodiment of the inventive concepts.

FIG. 7 is a timing diagram illustrating control signals and ramp signals provided to a pixel, according to at least one example embodiment of the inventive concepts. The description with reference to FIG. 7 will be based on the pixel PX of FIG. 3, but may also be applied equally to the pixels PXa, PXb, and PXc described with reference to FIGS. 4 through 6, respectively.

Referring to FIGS. 3 and 7, operations described below may be performed in the global signal dumping period GSDP. In the global signal dumping period GSDP, the first pre-charge select control signal PSEL1 and the second pre-charge select control signal PSEL2 may be transitioned from the second level (for example, logic low) to the first level (for example, logic high), and maintain the first level. For example, the first pre-charge select control signal PSEL1 may maintain a high level during a first time T11, and the second pre-charge select control signal PSEL2 may maintain a high level during a first time T21. In some embodiments, the first time T11 and the first time T21 may overlap each other, and for example, may be identical to each other. Because the first pre-charge select transistor PSX1 and the second pre-charge select transistor PSX2 maintain an on-state, a voltage of the floating diffusion node FD may be sampled by the first capacitor C1 or the second capacitor C2 connected to an output node (the second output node N2 in FIG. 3 or the first output node N1 in FIG. 7).

The reset control signal RS may be transitioned from a low level to a high level and maintain the first level during a first reset time RT1, and thereafter, may maintain the low level. As the reset transistor RX is turned on by the reset control signal RS of a high level, the floating diffusion node FD may be reset (a reset operation). For example, a voltage of the floating diffusion node FD may be reset to the first pixel voltage VPIX1.

After the reset control signal RS is transitioned from a high level to a low level, the first sampling control signal SPS1 may be transitioned from a low level to a high level, and maintain a high level during a reset settling time RCS. As the first sampling transistor SPX1 is turned on by the first sampling control signal SPS1 of a high level, a voltage of the floating diffusion node FD reset may be sampled by the first capacitor C1 connected to the output node N2.

After the first sampling control signal SPS1 is transitioned from a high level to a low level, the transmit control signal TS may be transitioned from a low level to a high level, and maintain a high level during a first transmit time TT1. As the transmit transistor TX is turned on by the transmit control signal TS of a high level, the photocharge generated by the photodiode PD may be integrated at the floating diffusion node FD (an integration operation). For example, the voltage of the floating diffusion node FD may be reduced from the first pixel voltage VPIX1 according to the amount of charge to be integrated.

After the transit control signal TS is transitioned from a high level to a low level, the second sampling control signal SPS2 may be transitioned from a low level to a high level, and maintain a high level during a signal settling time SCS. As the second sampling transistor SPX2 is turned on by the second sampling control signal SPS2 of a high level, the voltage of the floating diffusion node FD may be sampled by the second capacitor C2 connected to the output node.

During the global signal dumping period GSDP, the select control signal SEL may maintain a low level, and the pre-charge control signal PC may maintain a high level.

The operations described below may be performed during the read-out period ROP. In the read-out period ROP, the pre-charge control signal PC may continuously maintain a high level.

After transitioned from the low level to a high level, the reset control signal RS may maintain a high level during the second reset time RT2. In addition, the first pre-charge select control signal PSEL1 and the second pre-charge select control signal PSEL2 may be transitioned from a low level to a high level, the first pre-charge select control signal PSEL1 may maintain a high level during a second time T12, and the second pre-charge select control signal PSEL2 may maintain a high level during a second time T22. In addition, the transmit control signal TS may be transitioned from a low level to a high level, and the transmit control signal TS may maintain a high level during a second transmit time TT2. In this case, the second reset time RT2, the second time T12, the second time T22, and the second transmit time TT2 may be overlap each other. A shutter operation may be performed during the overlapping time.

The output node may be reset by the reset control signal RS of a high level, the first pre-charge select control signal PSEL1 of a high level, and the second pre-charge select control signal PSEL2 of a high level. For example, the output node may be reset to the first pixel voltage VPIX1. Accordingly, after the global signal dumping period GSDP is completed, the charge remaining at the output node may be removed (an output node reset operation).

As the reset control signal RS is transitioned from a high level to a low level, the first pre-charge select control signal PSEL1 is transitioned from a high level to a low level, and the second pre-charge select control signal PSEL2 is transitioned from a high level to a low level, when the output node reset operation is completed, the first sampling control signal SPS1 may be transitioned from a low level to a high level, and maintain a high level during a first settling time ST1. In this case, during the first settling time ST1 in which the first sampling control signal SPS1 maintains a high level, the select signal SEL may be at a high level, the select transistor SX may be turned on, and the reset signal RST corresponding to the charge according to the reset operation sampled in the first capacitor C1 may be output via the column line CL.

After the first sampling transistor SPX1 is turned on, the ramp signal RAMP may be generated to decrease (or increase) at a constant slope during a first time T1. The CDS circuit 160 may compare the ramp signal RAMP to the reset signal RST during the first time T1 in which a voltage level of the ramp signal RAMP changes continuously.

After the first settling time ST1 has passed and the first sampling control signal SPS1 has transitioned from a high level to a low level, the second sampling control signal SPS2 may be transitioned from a low level to a high level, and maintain a high level during a second settling time ST2. In this case, during the second settling time ST2 in which the second sampling control signal SPS2 maintains a high level, the select signal SEL may be at a high level, the select transistor SX may be turned on, and a first image signal SIG1 corresponding to the charge according to the integration operation sampled in the second capacitor C2 may be output via the column line CL.

After the second sampling transistor SPX2 is turned on, the ramp signal RAMP may be generated to decrease (or increase) at a constant slope during a second time T2. The CDS circuit 160 may compare the ramp signal RAMP to the first image signal SIG1 during the second time T2 in which the voltage level of the ramp signal RAMP changes continuously.

After the second settling time ST2 has passed and the second sampling control signal SPS2 has transitioned from a high level to a low level, the first sampling control signal SPS1 and the second sampling control signal SPS2 may be transitioned from a low level to a high level, and maintain a high level during a third settling time ST3. In this case, during the third settling time ST3, the select signal SEL may be at a high level, the select transistor SX may be turned on, and the second image signal SIG2 corresponding to the charge according to the integration operation sampled by the first capacitor C1 and the second capacitor C2 may be output via the column line CL.

After the first sampling transistor SPX1 and the second sampling transistor SPX2 are turned on, the ramp signal RAMP may be generated to decrease (or increase) at a constant slope during a third time T3. The CDS circuit 160 may compare the ramp signal RAMP to the second image signal SIG2 during the third time T3 in which the voltage level of the ramp signal RAMP changes continuously.

On the other hand, although it is illustrated in FIG. 7 that the pixel signal PXS is output in the order of the reset signal RST, the first image signal SIG1, and the second image signal SIG2, at least some example embodiments of the inventive concepts are not limited thereto. For example, the pixel signal PXS may be output in the order of the first image signal SIG1, the reset signal RST, and the second image signal SIG2.

Figure 8:
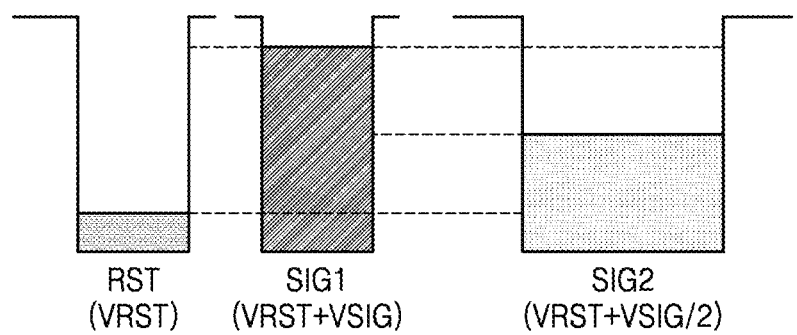
FIG. 8 is a diagram of voltages of a pixel signal, according to at least one example embodiment of the inventive concepts.

FIG. 8 is a diagram of voltages of the pixel signal PXS, according to at least one example embodiment of the inventive concepts. FIG. 8 is a diagram illustrating voltages of the reset signal RST, the first image signal SIG1, and the second image signal SIG2 in FIG. 7. The description with reference to FIG. 8 will be based on the pixel PX of FIG. 3, but may also be applied equally to the pixels PXa, PXb, and PXc described with reference to FIGS. 4 through 6, respectively.

Referring to FIGS. 3, 7 and 8, the voltage of the floating diffusion node FD may be reset to the first pixel voltage VPIX1 during the first reset time RT1 in the global signal dumping period GSDP. Thereafter, during a reset settling period RCS, the first sampling transistor SPX1 may be turned on, and the voltage of the floating diffusion node FD which is reset may be sampled by the first capacitor C1 connected to the output node. The voltage corresponding to the charge integrated in the first capacitor C1 may be referred to as a reset voltage VRST.

During the transmit time TT in the global signal dumping period GSDP, the floating diffusion node FD may integrate the photocharge generated by the photodiode PD. In this case, the floating diffusion node FD may additionally integrate the photocharge generated by the photodiode PD in a previous rest state. Thereafter, during the signal settling period SCS, the second sampling transistor SPX2 may be turned on, and the voltage of the floating diffusion node FD at which the photocharge generated by the photodiode PD has been integrated may be sampled by the second capacitor C2 connected to the output node. The voltage corresponding to the charge integrated in the second capacitor C2 may be represented by a sum of the reset voltage VRST and an image voltage VSIG corresponding to the photocharge generated by the photodiode PD.

The reset signal RST corresponding to the charge integrated in the first capacitor C1 may be output during the first settling time ST1 in the read-out period ROP. A voltage of the reset signal RST may correspond to the reset voltage VRST. Thereafter, during the second settling time ST2, the first image signal SIG1 corresponding to the charge integrated in the second capacitor C2 may be output. A voltage of the first image signal SIG1 may correspond to a sum of the reset voltage VRST and the image voltage VSIG.

Thereafter, during the third settling time ST3, the second image signal SIG2 corresponding to the charge integrated in the first capacitor C1 and the second capacitor C2 may be output. In a non-limiting example, the capacitance of the first capacitor C1 may be the same as the capacitance of the second capacitor C2. In this case, due to a parallel connection of the capacitors, the capacitance thereof may be reduced to about ½. Accordingly, a voltage of the second image signal SIG2 may correspond to a sum of the image voltage VSIG*(½) and the reset voltage VRST. Because the second image signal SIG2 includes the reset voltage VRST such as the first image signal SIG1, the second image signal SIG2 may be used for the correlation dual sampling CDS together with the reset signal RST.

According to at least one example embodiment of the inventive concepts, the first image signal SIG1 and the second image signal SIG2 may be selectively used for generating the image data IDT according to the illuminance state. In some embodiments, in the first mode, the first image signal SIG1 may be used, and in the second mode, the second image signal SIG2 may be used.

The ADC circuit 150, that converts the image signal, or an analog signal, to a pixel value, or a digital signal, may be designed to have ADC saturation (ADCSAT) corresponding to a voltage range of the image signal. In this case, when the ADC circuit 150 is implemented to use the first image signal SIG1 in the first mode (e.g., the low illuminance state) in which the voltage of the image signal is relatively low, and use the second image signal SIG2 in the second mode (e.g., the high illuminance state) in which the voltage of the image signal is relatively high, the voltage range of the image signal may be reduced, and thus, the ADCSAT of the ADC circuit 150 may also be designed to be small.

When the ADCSAT is small, the second pixel voltage VPIX2 used to generate the pixel signal PXS that is provided to the ADC circuit 150 may also be reduced. Accordingly, the power consumption of the image sensor 100 may be reduced.

In addition, the high illuminance operation range of the pixel PX may be determined by full well capacity (FWC) of the photodiode PD, a conversion gain (CG), and the ADCSAT, and the FWC, the CG, and the ADCSAT may be related in a trade off. The image sensor 100 according to the embodiment may be designed to have a small ADCSAT, and thus, the FWC and the CG may be increased.

Figure 9:
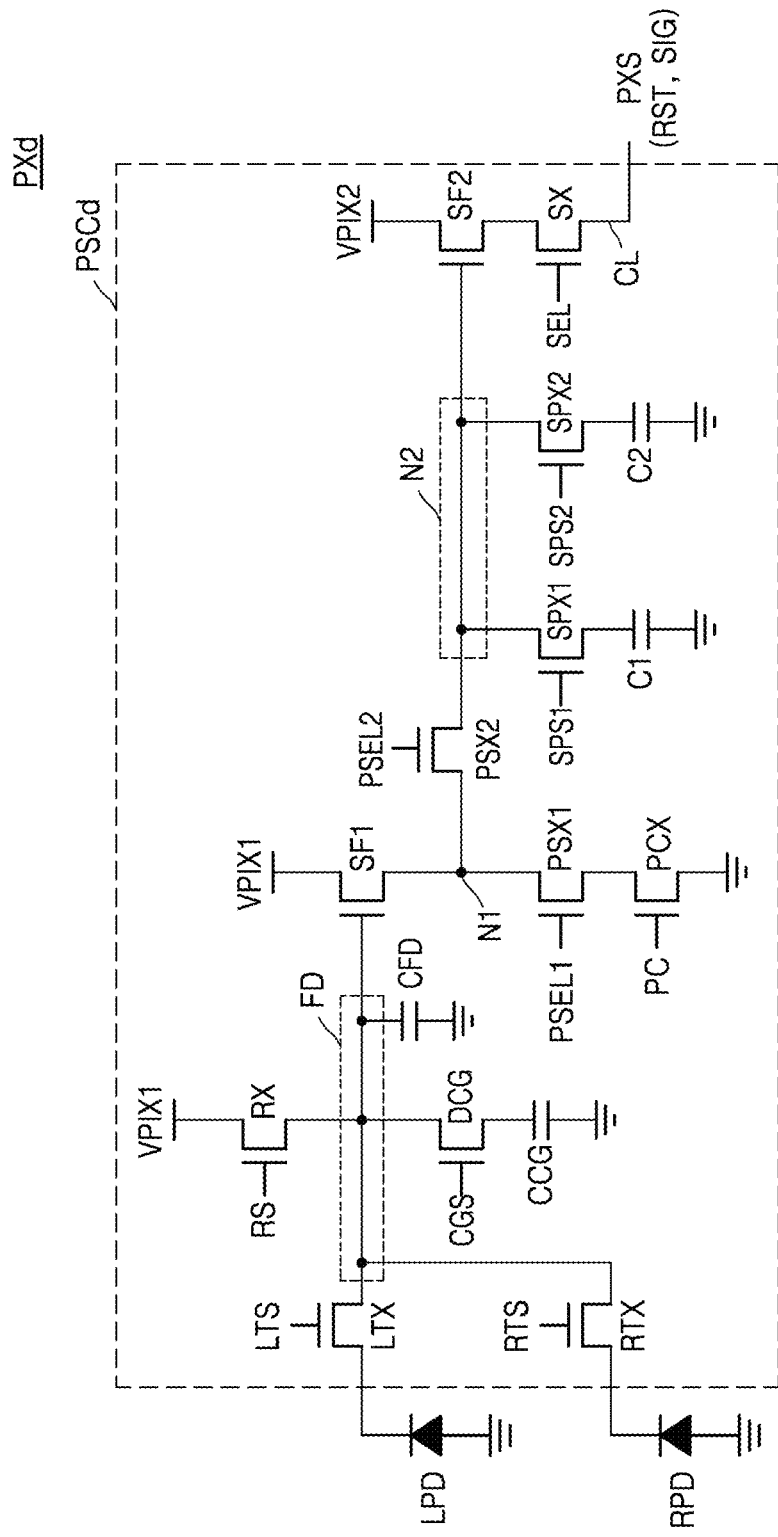
FIG. 9 is a circuit diagram of a pixel, according to at least one example embodiment of the inventive concepts.

FIG. 9 is a circuit diagram of a pixel PXd, according to at least one example embodiment of the inventive concepts. FIG. 9 is a diagram illustrating a modifiable embodiment of the pixel PX of FIG. 3. In the descriptions with reference to FIG. 9, duplicate descriptions with reference to FIG. 3 are omitted.

Referring to FIG. 9, the pixel PXd may include first and second photodiodes LPD and RPD, and a pixel signal generating circuit PSCd for generating the pixel signal PXS. The first and second photodiodes LPD and RPD may be arranged under one microlens. Control signals, such as LTS, RTS, RS, CGS, PSEL1, PSEL2, PC, SPS1, SPS2, and SEL, may be applied to the pixel signal generating circuit PSCd, and at least some of the control signals may be generated by the row driver 120.

The pixel signal generating circuit PSCd may include a plurality of transistors, such as LTX, RTX, DCG, RX, SF1, PSX1, PSX2, PCX, SPX1, SPX2, SF2, and SX, a floating diffusion capacitor CFD, a conversion gain capacitor CCG, the first capacitor C1, and the second capacitor C2. In the first capacitor C1 and the second capacitor C2, the charge according to the reset operation may be integrated, or the charge according to a photocharge integration operation may be integrated.

The pixel PXd may include a first photodiode LPD, and the pixel signal generating circuit PSCd may include a first transmit transistor LTX. The first transmit transistor LTX may be connected between the first photodiode LPD and the floating diffusion node FD. A first terminal of the first transmit transistor LTX may be connected to an output terminal of the first photodiode LPD, and a second terminal of the first transmit transistor LTX may be connected to the floating diffusion node FD. The first transmit transistor LTX may be turned on or off in response to a first transmit control signal LTS received from the row driver 120, and may transmit the photocharge generated by the first photodiode LPD to the floating diffusion node FD.

The pixel PXd may include a second photodiode RPD, and the pixel signal generating circuit PSCd may include a second transmit transistor RTX. The second photodiode RPD may be connected between the second photodiode RPD and the floating diffusion node FD. A first terminal of the second transmit transistor RTX may be connected to an output terminal of the second photodiode RPD, and a second terminal of the second transmit transistor RTX may be connected to the floating diffusion node FD. The second transmit transistor RTX may be turned on or off in response to a second transmit control signal RTS received from the row driver 120, and may transmit the photocharge generated by the second photodiode RPD to the floating diffusion node FD.

The pixel signal generating circuit PSCd may include the conversion gain transistor DCG. A first terminal of the conversion gain transistor DCG may be connected to the floating diffusion node FD, and a second terminal of the conversion gain transistor DCG may be connected to the conversion gain capacitor CCG. The conversion gain transistor DCG may be on or off in response to a conversion gain signal CGS received from the row driver 120, and may connect the conversion gain capacitor CCG to the floating diffusion node FD. In addition, the pixel signal generating circuit PSCd may include a floating diffusion capacitor CFD.

The floating diffusion capacitor CFD may include a parasitic capacitor formed in the floating diffusion node FD.

When the conversion gain transistor DCG is turned on, the conversion gain capacitor CCG are connected to the floating diffusion capacitor CFD in parallel, and the capacitance may be reduced, and the conversion gain may be increased. In other words, when the conversion gain transistor DCG is turned on, the pixel signal generating circuit PSCd may operate in a low conversion gain mode. On the other hand, when the conversion gain transistor DCG is turned off, the pixel signal generating circuit PSCd may operate in a high conversion gain mode.

According to at least some example embodiments of the inventive concepts, the charge according to the reset operation and the integration operation in the high conversion gain mode may be integrated in the first capacitor C1 and the second capacitor C2. In addition, the charge according to the reset operation and the integration operation in the low conversion gain mode may be integrated in the conversion gain transistor DCG and the floating diffusion capacitor CFD. Details of these operations are described later with reference to FIG. 10.

Figure 10:
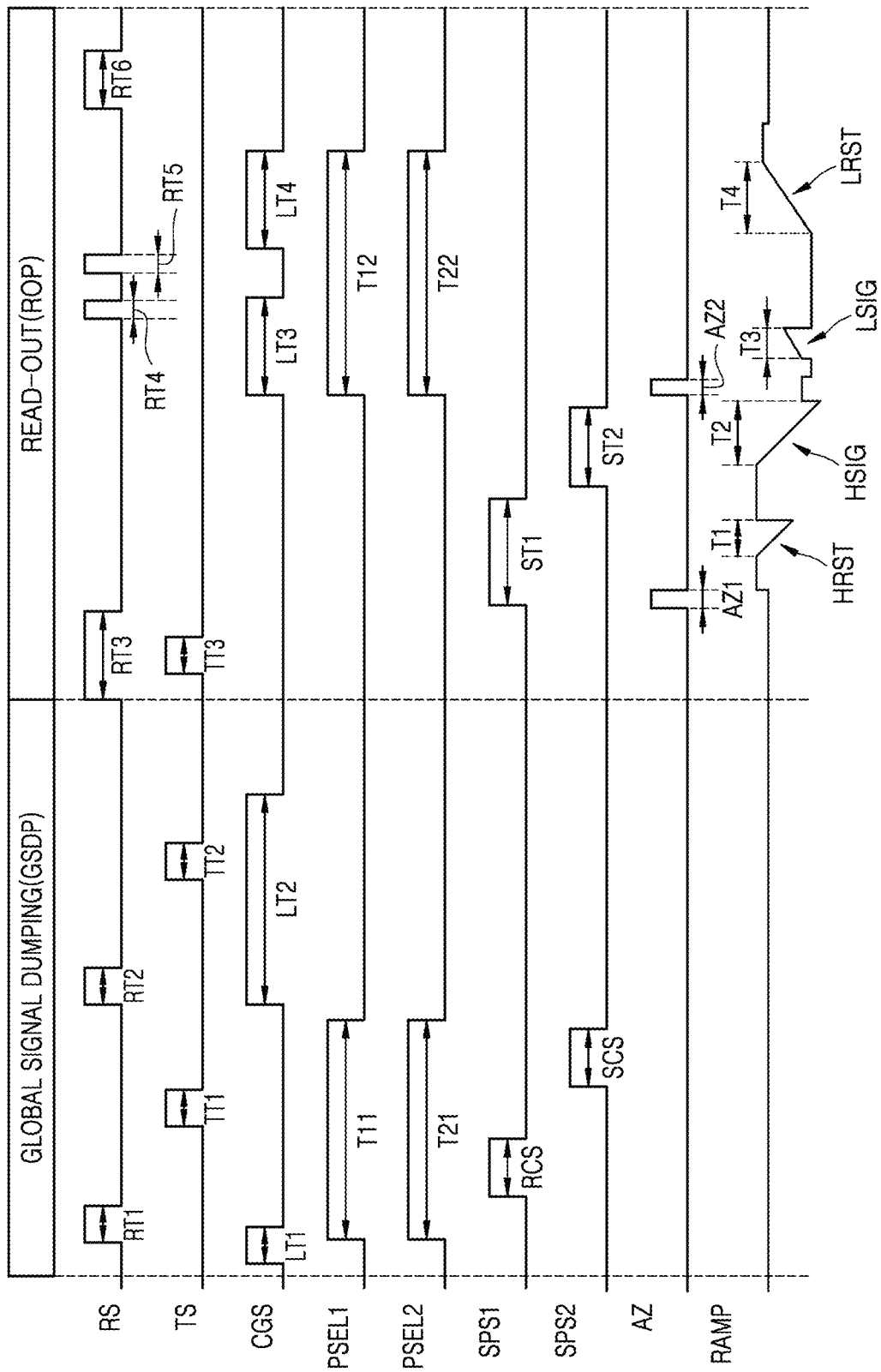
FIG. 10 is a timing diagram illustrating control signals and ramp signals provided to a pixel, according to at least one example embodiment of the inventive concepts.

FIG. 10 is a timing diagram illustrating the control signals and the ramp signals provided to a pixel, according to at least one example embodiment of the inventive concepts. The control signals described with reference to FIG. 10 may be provided to the pixel PXd described with reference to FIG. 9. Hereinafter, for convenience of description, the transmit transistor TX may be used as an expression to indicate the first transmit transistor LTX and the second transmit transistor RTX together, and the transmit control signal TS may be used as an expression to indicate the first transmit control signal LTS and the second transmit control signal RTS.

Referring to FIGS. 9 and 10, operations described below may be performed in the global signal dumping period GSDP. In the global signal dumping period GSDP, a conversion gain signal CSG may be transitioned from the second level (for example, logic low) to the first level (for example, logic high), and the conversion gain signal CGS may maintain a high level during a first time LT1. In addition, the reset control signal RS may be transitioned from a low level to a high level, and the reset control signal RS may maintain a high level during the first reset time RT1. In addition, the first pre-charge select control signal PSEL1 and the second pre-charge select control signal PSEL2 may be transitioned from a low level to a high level, the first pre-charge select control signal PSEL1 may maintain a high level during the first time T11, and the second pre-charge select control signal PSEL2 may maintain a high level during the first time T21. In some embodiments, at least some of the first time LT1, the first reset time RT1, the first time T11, and the first time T12 may overlap each other.

As the reset transistor RX is turned on by the reset control signal RS of a high level, the floating diffusion node FD may be reset (a reset operation). For example, a voltage of the floating diffusion node FD may be reset to the first pixel voltage VPIX1. In addition, when the conversion gain transistor DCG and the reset transistor RX are simultaneously turned on and operating, the conversion gain capacitor CCG may be reset to the first pixel voltage VPIX1. In addition, when the reset transistor RX, the first pre-charge select transistor PSX1, and the second pre-charge select transistor PSX2 are simultaneously turned on and operating, an output node (for example, the first output node N1 and the second output node N2 in FIG. 9) may be reset.

The conversion gain signal CGS and the reset control signal RS may be transitioned from a high level to a low level, and the first pre-charge select control signal PSEL1 and the second pre-charge select control signal PSEL2 may continuously maintain a high level. The first sampling control signal SPS1 may be transitioned from a low level to a high level, and maintain a high level during the reset settling time RCS. As the first sampling transistor SPX1 is turned on by the first sampling control signal SPS1 of a high level, a voltage of the floating diffusion node FD which is reset may be sampled by the first capacitor C1 connected to the output node N2. In this case, because the conversion gain signal CGS is at a low level, the charge sampled by the first capacitor C1 may correspond to the reset signal in the high conversion gain mode.

After the first sampling control signal SPS1 is transitioned from a high level to a low level, the transmit control signal TS may be transitioned from a low level to a high level, and maintain a high level during a first transmit time TT1. As the transmit transistor TX is turned on by the transmit control signal TS of a high level, the photocharge generated by the photodiode PD may be integrated at the floating diffusion node FD (the integration operation). For example, the voltage of the floating diffusion node FD may be reduced from the first pixel voltage VPIX1 according to the amount of charge to be integrated.

After the transit control signal TS is transitioned from a high level to a low level, the second sampling control signal SPS2 may be transitioned from a low level to a high level, and maintain a high level during a signal settling time SCS. As the second sampling transistor SPX2 is turned on by the second sampling control signal SPS2 of a high level, the voltage of the floating diffusion node FD may be sampled by the second capacitor C2 connected to the output node. In this case, because the conversion gain signal CGS is at a low level, the charge sampled by the second capacitor C2 may correspond to the image signal in the high conversion gain mode.

The first pre-charge select control signal PSEL1 and the second pre-charge select control signal PSEL2 may be transitioned from a high level to a low level. The conversion gain signal CGS may be transitioned from a low level to a high level, and may maintain a high level during a second time LT2. In addition, the reset control signal RS may be transitioned from a low level to a high level, and the reset control signal RS may maintain a high level during the second reset time RT2. In some embodiments, at least some of a second time LT1 and the second reset time RT2 may overlap each other.

After the reset control signal RS is transitioned from a high level to a low level, the transmit control signal TS may be transitioned from a low level to a high level, and maintain a high level during the second transmit time TT2. In this case, the conversion gain signal CGS may continuously maintain a high level. As the transmit transistor TX is turned on by the transmit control signal TS of a high level, the photocharge generated by the photodiode PD may be integrated at the floating diffusion node FD (the integration operation). In this case, because the conversion gain signal CGS is at a high level, the charge integrated at the floating diffusion node FD may be sampled by the conversion gain signal CGS. On the other hand, the charge sampled by the conversion gain capacitor CCG may correspond to the image signal in a low conversion gain mode.

Although not illustrated in FIG. 10, the select control signal SEL may maintain a low level in the global signal dumping period GSDP, and the pre-charge control signal PC may maintain a high level.

The operations described below may be performed during the read-out period ROP. In the read-out period ROP, the pre-charge control signal PC may continuously maintain a high level.

After transitioned from the low level to a high level, the reset control signal RS may maintain a high level during a third reset time RT3. In addition, the transmit control signal TS may be transitioned from a low level to a high level, and the transmit control signal TS may maintain a high level during a third transmit time TT3. In this case, the third reset time RT3 and the third transmit time TT3 may overlap each other. The shutter operation may be performed during the overlapping time.

When the reset control signal RS and the transmit control signal TS are transitioned from a high level to a low level, the first sampling control signal SPS1 may be transitioned from a low level to a high level, and may maintain a high level during the first settling time ST1. In this case, an auto-zero AZ that controls the ADC circuit 150 to remove offset of an amplifier included therein may be transitioned from a low level to a high level, and may maintain a high level during a first auto-zero signal AZ1. In some embodiments, at least some of the first settling time ST1 and the first auto-zero signal AZ1 may overlap each other.

In addition, during the first settling time ST1 in which the first sampling control signal SPS1 maintains a high level, the select signal SEL may be at a high level, the select transistor SX may be turned on, and a reset signal HRST corresponding to the charge according to the reset operation sampled in the first capacitor C1 may be output via the column line CL. In other words, the reset signal HRST in the high conversion gain mode may be output via the column line CL.

After the first sampling transistor SPX1 is turned on, the ramp signal RAMP may be generated to decrease (or increase) at a constant slope during a first time T1. The CDS circuit 160 may compare the ramp signal RAMP to the reset signal HRST in the high conversion gain mode during the first time T1 in which a voltage level of the ramp signal RAMP changes continuously.

After the first settling time ST1 has passed and the first sampling control signal SPS1 has transitioned from a high level to a low level, the second sampling control signal SPS2 may be transitioned from a low level to a high level, and maintain a high level during a second settling time ST2. In this case, during the second settling time ST2 in which the second sampling control signal SPS2 maintains a high level, the select signal SEL may be at a high level, the select transistor SX may be turned on, and an image signal HSIG corresponding to the charge according to the integration operation sampled in the second capacitor C2 may be output via the column line CL. In other words, the image signal HSIG in the high conversion gain mode may be output via the column line CL.

After the second sampling transistor SPX2 is turned on, the ramp signal RAMP may be generated to decrease (or increase) at a constant slope during a second time T2. The CDS circuit 160 may compare the ramp signal RAMP to the image signal HSIG in the high conversion gain mode during the second time T2 in which a voltage level of the ramp signal RAMP changes continuously.

Thereafter, the conversion gain signal CGS may be transitioned from a low level to a high level, and may maintain a high level during a third time LT3. In this case, the auto-zero signal AZ may also be transitioned from a low level to a high level, and maintain a high level during a second auto-zero signal AZ2. In addition, the first pre-charge select control signal PSEL1 and the second pre-charge select control signal PSEL2 may be transitioned from a low level to a high level, the first pre-charge select control signal PSEL1 may maintain a high level during a second time T12, and the second pre-charge select control signal PSEL2 may maintain a high level during a second time T22. In some embodiments, the third time LT3, the second auto-zero signal AZ2, the second time T12, and the second time T22 may overlap each other.

In addition, the select signal SEL may be at a high level during the second time T12 and the second time T22 in which the conversion gain signal CGS, the first pre-charge select control signal PSEL1, and the second pre-charge select control signal PSEL2 maintain a high level, and the select transistor SX may be turned on and the image signal LSIG corresponding to the charge according to the integration operation sampled by the conversion gain capacitor CCG may be output via the column line CL. In other words, the image signal LSIG in the low conversion gain mode may be output via the column line CL.

After the select transistor SX is turned on, the ramp signal RAMP may be generated to increase (or decrease) at a constant slope during the third time T3. The CDS circuit 160 may compare the ramp signal RAMP to the image signal LSIG in the low conversion gain mode during the third time T3 in which a voltage level of the ramp signal RAMP changes continuously.

The reset control signal RS may maintain a high level during a fourth reset time RT4 in the third time LT3 in which the conversion gain signal CGS maintains a high level. Accordingly, the conversion gain capacitor CCG may be reset. In addition, when the conversion gain signal CGS has been transitioned to a low level, the reset control signal RS may maintain a high level during a fifth reset time RT5. Accordingly, an offset in the low conversion gain mode may be removed. In this case, the first pre-charge select control signal PSEL1 and the second pre-charge select control signal PSEL2 may continuously maintain a high level.

Thereafter, the conversion gain signal CGS may be transitioned from a low level to a high level, and may maintain a high level during a fourth time LT4. During the fourth time LT4, the select signal SEL may be at a high level, and the select transistor SX may be turned on, and a reset signal LRST corresponding to the charge according to the reset operation sampled by the conversion gain capacitor CCG may be output via the column line CL. In other words, the reset signal LRST in the low conversion gain mode may be output via the column line CL. In this case, the first pre-charge select control signal PSEL1 and the second pre-charge select control signal PSEL2 may continuously maintain a high level.

After the select transistor SX is turned on, the ramp signal RAMP may be generated to increase (or decrease) at a constant slope during a fourth time T4. The CDS circuit 160 may compare the ramp signal RAMP to the reset signal LRST in the low conversion gain mode during the fourth time T4 in which a voltage level of the ramp signal RAMP changes continuously.

The first pre-charge select control signal PSEL1 and the second pre-charge select control signal PSEL2 may be transitioned from a high level to a low level, and the reset control signal RS may maintain a high level during a sixth reset time RT6. Accordingly, the floating diffusion node FD may be reset.

Figure 11:
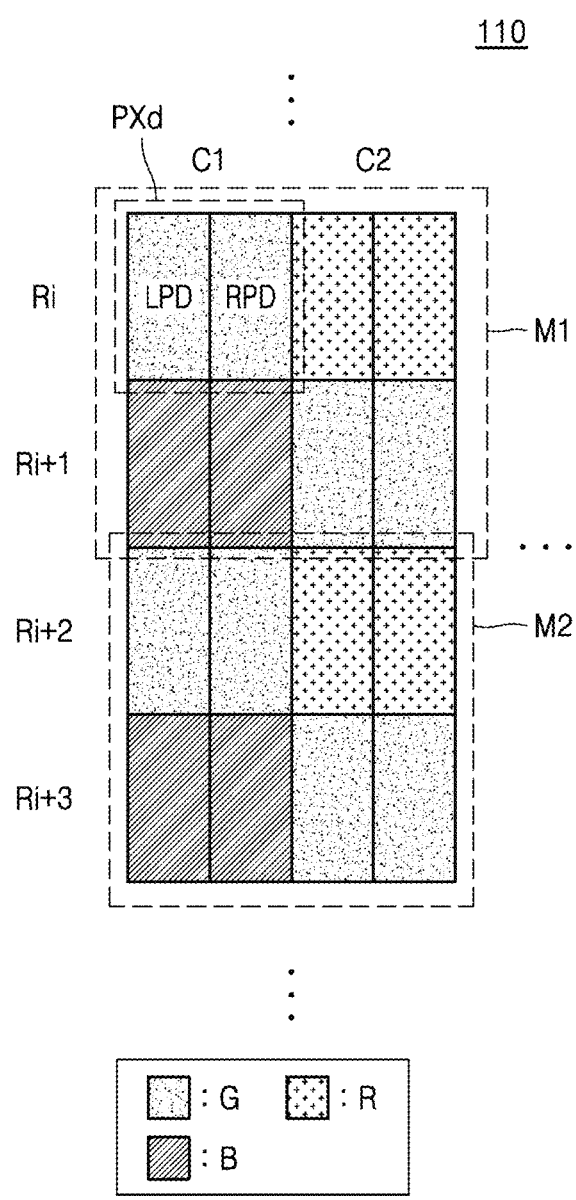
FIG. 11 is a diagram for describing an auto-focusing operation, according to at least one example embodiment of the inventive concepts.

FIG. 11 is a diagram for describing an auto-focusing operation, according to at least one example embodiment of the inventive concepts. FIG. 11 is a diagram for describing an auto-focusing (AF) operation of the image sensor 100 including the pixel PXd of FIG. 9. In some embodiments, the image sensor 100 may generate AF information in units of two frame periods. The image sensor 100 may obtain the pixel signals from the pixels PXd according to the method described above in a first frame section, generate image data IDT, and obtain the pixel signals from the pixels PXd in a second frame section and obtain the AF information. The image sensor 100 may adjust the focus of a lens (not illustrated) based on the obtained AF information. Hereinafter, an operation of acquiring AF information by the image sensor 100 will be described in detail.

Referring to FIG. 9 and FIG. 11, the pixel array 110 of the image sensor 100 may include the pixels PXd of FIG. 9, and the pixels PXd may include red pixels R, first green pixels G, second green pixels G, and blue pixels, which are repeatedly arranged in a 2×2 matrix form. One pixel PXd may include two photodiodes, that is, LPD and RPD, and two photodiode, that is, LPD and RPD may be arranged in line along a low line (or column line). The image sensor 100 may generate the AF information by binning the pixel signals in units of 2×2 matrices.

At least some example embodiments of the inventive concepts, when the pixels PXd of each matrix output the image signal SIG, the pixels PXd may output the image signal SIG of the first photodiode LPD, or the image signal SIG of the second photodiode RPD. In some embodiments, the pixels PXd included in the matrix may be controlled to alternately output the image signal SIG of the first photodiode LPD or the image signal SIG of the second photodiode RPD along rows.

For example, referring to FIG. 11, each of the pixels PXd included in a first matrix M1 over $i^{th}$ row Ri and $(i+1)^{th}$ row (Ri+1) may output the image signal SIG of the first photodiode LPD. In addition, each of the pixels PXd included in a second matrix M2 over $(i+2)^{th}$ row (Ri+2) and $(i+3)^{th}$ row (Ri+3) may output the image signal SIG of the second photodiode RPD.

A detailed operation of outputting the image signal SIG of the first photodiode LPD or the second photodiode RPD may be performed in two methods. The two methods will be described with reference to FIG. 9.

First, according to a first method, the pixel PXd may reset the floating diffusion node FD, and store the charge corresponding to the reset floating diffusion node FD in the first capacitor C1. The charge stored in the first capacitor C1 may be output as the reset signal RST. In addition, the pixel PXd may store the charge generated by the first photodiode LPD or the second photodiode RPD at the floating diffusion node FD, and store the stored charge corresponding to the floating diffusion node FD in the second capacitor C2. In other words, the pixels PXd of the first matrix M1 may store the charge generated by the first photodiode LPD in the second capacitor C2, and the pixels PXd of the second matrix M2 may store the charge generated by the second photodiode RPD in the second capacitor C2. The charge store in the second capacitor C2 may be output as the image signal SIG. The image sensor 100 may generate the AF information based on the output reset signal RST and image signal SIG.

According to a second method, the pixel PXd may reset the floating diffusion node FD, and store the charge corresponding to the reset floating diffusion node FD in the conversion gain capacitor CCG and the floating diffusion capacitor CFD. The charge stored in the conversion gain capacitor CCG and the floating diffusion capacitor CFD may be output as the reset signal RST. In addition, the pixel PXd may integrate the charge generated by the first photodiode LPD and the second photodiode RPD in the floating diffusion node FD, and store the integrated charge corresponding to the floating diffusion node FD in the first capacitor CL. In other words, the pixels PXd of the first matrix M1 may store the charge generated by the first photodiode LPD in the first capacitor C1, and the pixels PXd of the second matrix M2 may store the charge generated by the second photodiode RPD in the first capacitor C1. The charge stored in the first capacitor C1 may be output as the first image signal SIG1. The image sensor 100 may generate the AF information based on the output reset signal RST and first image signal SIG1.

According to the second method, the pixel PXd may store the charge generated by the first photodiode LPD and the second photodiode RPD at the floating diffusion node FD, and store the stored charge corresponding to the floating diffusion node FD in the second capacitor C2. In addition, the charge stored in the second capacitor C2 may be output as the second image signal SIG2. The second image signal SIG2 may be used for generating the image data IDT. In connection with FIG. 11, it has been described that the pixels PXd are arranged in a 2×2 matrix form, but the embodiment is not limited thereto, and the above-described AF operation may be substantially identically applied to cases in which the pixels PXd are arranged in various forms such as a 4×4 matrix and 6×6 matrix.

Figure 12:
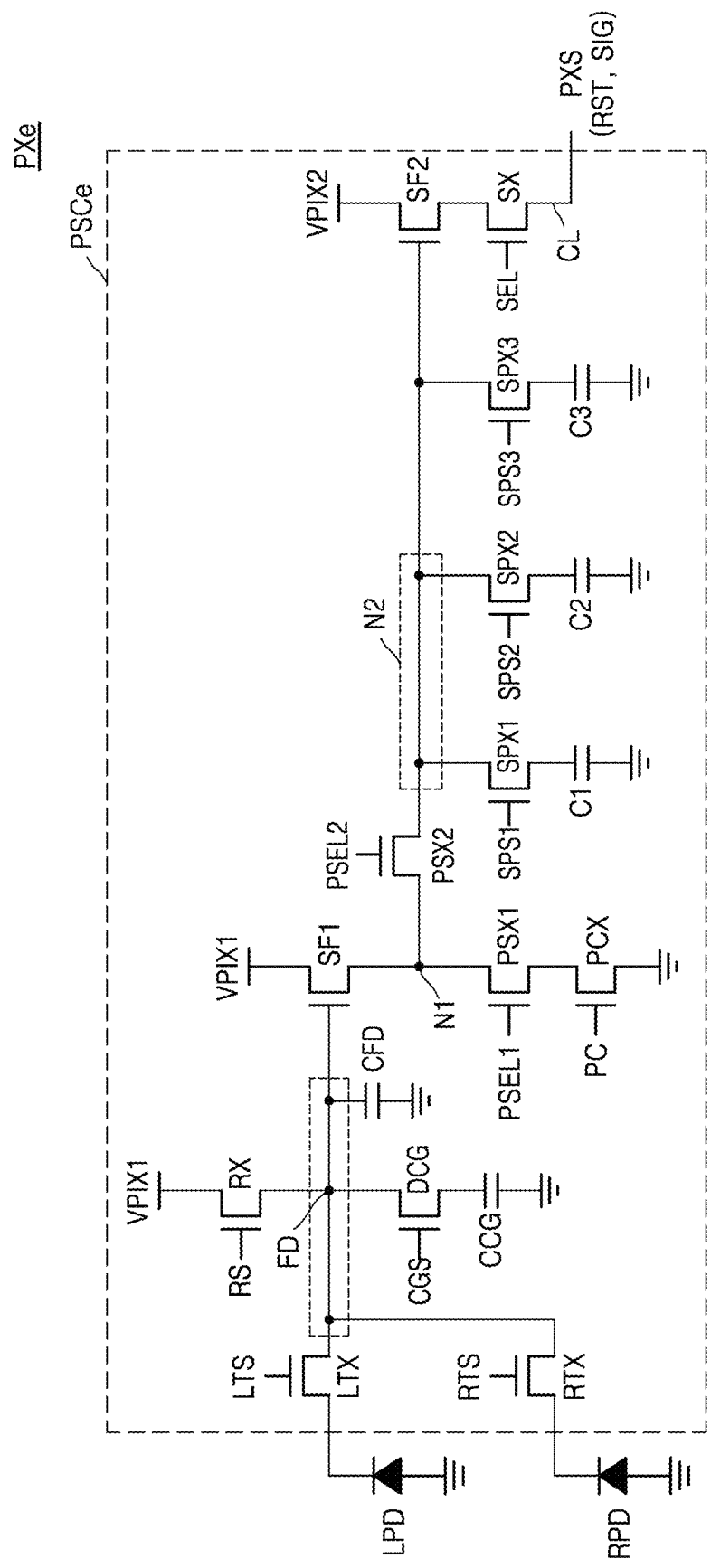
FIG. 12 is a circuit diagram of a pixel, according to at least one example embodiment of the inventive concepts.

FIG. 12 is a circuit diagram of a pixel PXe, according to at least one example embodiment of the inventive concepts. FIG. 12 is a diagram illustrating a modifiable embodiment of the pixel PXd of FIG. 9. In the descriptions with reference to FIG. 12, duplicate descriptions with reference to FIG. 9 are omitted.

Referring to FIG. 12, the pixel PXe may include first and second photodiodes LPD and RPD, and a pixel signal generating circuit PSCe for generating the pixel signal PXS. Control signals, such as LTS, RTS, RS, CGS, PSEL1, PSEL2, PC, SPS1, SPS2, SPS3, and SEL, may be applied to the pixel signal generating circuit PSCe, and at least some of the control signals may be generated by the row driver 120.

Comparing the pixel signal generating circuit PSCd in FIG. 9 to the pixel signal generating circuit PSCe in FIG. 12, in the pixel signal generating circuit PSCe in FIG. 12, a third pre-charge select transistor PSX3 and a third capacitor C3 may be added. A first terminal of the third pre-charge select transistor PSX3 may be connected to the second output node N2, and a second terminal of the third pre-charge select transistor PSX3 may be connected to the third capacitor C3. In addition, the ground voltage may be applied to a first terminal of the third capacitor C3, and a second terminal of the third capacitor C3 may be connected to the third pre-charge select transistor PSX3.

Figure 13:
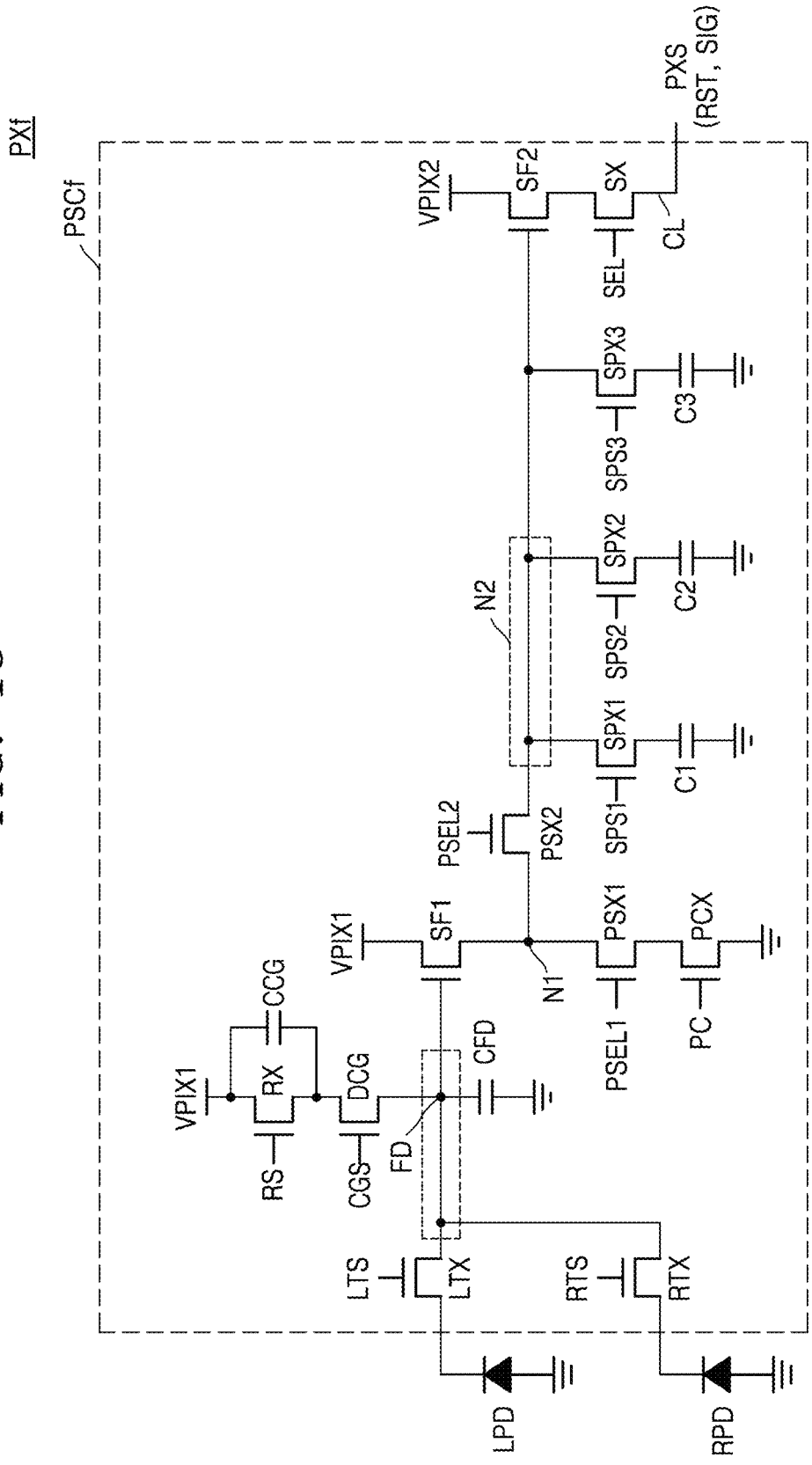
FIG. 13 is a circuit diagram of a pixel, according to at least one example embodiment of the inventive concepts.

FIG. 13 is a circuit diagram of a pixel PXf, according to at least one example embodiment of the inventive concepts. FIG. 13 is a diagram illustrating a modifiable example of the pixel PXe of FIG. 12. In the descriptions with reference to FIG. 13, duplicate descriptions with reference to FIG. 12 are omitted.

Referring to FIG. 13, the pixel PXf may include first and second photodiodes LPD and RPD, and a pixel signal generating circuit PSCf for generating the pixel signal PXS. Control signals, such as LTS, RTS, RS, CGS, PSEL1, PSEL2, PC, SPS1, SPS2, SPS3, and SEL, may be applied to the pixel signal generating circuit PSCf, and at least some of the control signals may be generated by the row driver 120.

Comparing the pixel signal generating circuit PSCe in FIG. 12 to the pixel signal generating circuit PSCf in FIG. 13, in the pixel signal generating circuit PSCf in FIG. 13, the conversion gain transistor DCG may be connected between the floating diffusion node FD and the reset transistor RX. The first terminal of the conversion gain transistor DCG may be connected to the floating diffusion node FD, and the second terminal of the conversion gain transistor DCG may be connected to the reset transistor RX. In addition, the conversion gain capacitor CCG may be connected to the reset transistor RX in parallel.

In connection with FIGS. 9, 12, and 13, it has been described that the conversion gain transistor DCG is included in one pixel, but the embodiment is not limited thereto. For example, it may be implemented that the first terminal of the conversion gain transistor DCG is connected to a particular pixel of the floating diffusion node FD, and the second terminal thereof is connected to the other pixel of the floating diffusion node FD. The first terminal of the conversion gain transistor DCG may be connected to the floating diffusion node FD of a pixel arranged on an $N^{th}$ column (or $N^{th}$ row), and the second terminal may be connected to the floating diffusion node FD of an adjacent pixel arranged on a $(N+1)^{th}$ column (or $(N+1)^{th}$ row)). Accordingly, the floating diffusion node FD of the adjacent pixel may be shared via the conversion gain transistor DCG, and it may be designed in a direction to increase a full well capacity (FWC) of the pixel arranged on the Nth column (or $N^{th}$ row).

Figure 14:
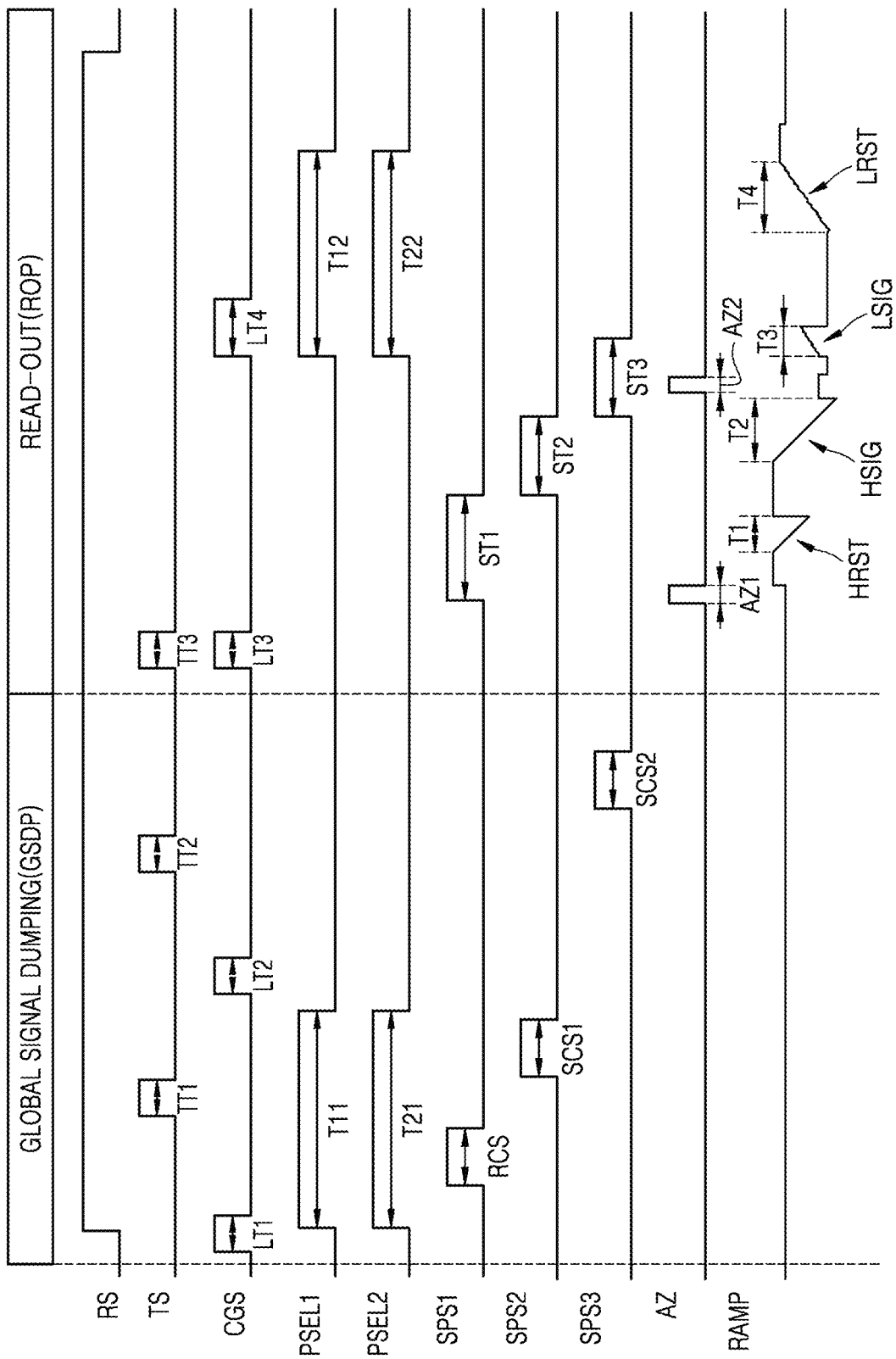
FIG. 14 is a timing diagram illustrating control signals and ramp signals provided to a pixel, according to at least one example embodiment of the inventive concepts.

FIG. 14 is a timing diagram illustrating control signals and ramp signals provided to a pixel, according to at least one example embodiment of the inventive concepts. Descriptions with reference to FIG. 14 may be given based on the pixel PXf of FIG. 13, but may be similarly applied to the pixel PXe of FIG. 12.

Hereinafter, for convenience of description, the transmit transistor TX may be used as an expression to indicate the first transmit transistor LTX and the second transmit transistor RTX together, and the transmit control signal TS may be used as an expression to indicate the first transmit control signal LTS and the second transmit control signal RTS.

Referring to FIGS. 13 and 14, operations described below may be performed in the global signal dumping period GSDP. The reset control signal RS may maintain a high level during the global signal dumping period GSDP. In addition, the conversion gain signal CSG may be transitioned from logic low to logic high, and maintain a high level during the first time LT1. In addition, the first pre-charge select control signal PSEL1 and the second pre-charge select control signal PSEL2 may be transitioned from a low level to a high level, the first pre-charge select control signal PSEL1 may maintain a high level during the first time T11, and the second pre-charge select control signal PSEL2 may maintain a high level during the first time T21. In some embodiments, at least some of the first time LT1, the first time T11, and the first time T12 may overlap each other.

As the reset transistor RX and the conversion gain transistor DCG are turned on, the floating diffusion node FD may be reset (the reset operation). For example, a voltage of the floating diffusion node FD may be reset to the first pixel voltage VPIX1. In addition, when the reset transistor RX, the first pre-charge select transistor PSX1, and the second pre-charge select transistor PSX2 are turned on, an output node (for example, the first output node N1 and the second output node N2 in FIG. 14) may be reset.

The conversion gain signal CGS may be transitioned from a high level to a low level, and the first pre-charge select control signal PSEL1 and the second pre-charge select control signal PSEL2 may continuously maintain a high level. The first sampling control signal SPS1 may be transitioned from a low level to a high level, and maintain a high level during the reset settling time RCS. As the first sampling transistor SPX1 is turned on by the first sampling control signal SPS1 of a high level, a voltage of the floating diffusion node FD which is reset may be sampled by the first capacitor C1 connected to the output node N2. In this case, because the conversion gain signal CGS is at a low level, the charge sampled by the first capacitor C1 may correspond to the reset signal in the high conversion gain mode.

After the first sampling control signal SPS1 is transitioned from a high level to a low level, the transmit control signal TS may be transitioned from a low level to a high level, and maintain a high level during a first transmit time TT1. As the transmit transistor TX is turned on by the transmit control signal TS of a high level, the photocharge generated by the photodiode PD may be integrated at the floating diffusion node FD (the integration operation). For example, the voltage of the floating diffusion node FD may be reduced from the first pixel voltage VPIX1 according to the amount of charge to be integrated.

After the transit control signal TS is transitioned from a high level to a low level, the second sampling control signal SPS2 may be transitioned from a low level to a high level, and maintain a high level during a first signal settling time SCS1. As the second sampling transistor SPX2 is turned on by the second sampling control signal SPS2 of a high level, the voltage of the floating diffusion node FD may be sampled by the second capacitor C2 connected to the output node. In this case, because the conversion gain signal CGS is at a low level, the charge sampled by the second capacitor C2 may correspond to the image signal in the high conversion gain mode.

Thereafter, the second sampling control signal SPS2, the first pre-charge select control signal PSEL1, and the second pre-charge select control signal PSEL2 may be transitioned from a high level to a low level. In addition, the conversion gain signal CGS may be transitioned from a low level to a high level, and maintain a high level during the second time LT2. Thereafter, the transmit control signal TS may be transitioned from a low level to a high level, and maintain a high level during the second transmit time TT2. Thereafter, a third sampling control signal SPS3 may be transitioned from a low level to a high level, and maintain a high level during a second signal settling time SCS3.

The operations described below may be performed during the read-out period ROP. The reset control signal RS may continuously maintain a high level. Thereafter, the transmit control signal TS may be transitioned from a low level to a high level, and maintain a high level during the third transmit time TT3. In this case, the conversion gain signal CGS may also be transitioned from a low level to a high level, and maintain a high level during the third time LT3. In this case, the third transmit time TT3 and the third time LT3 may overlap each other. The shutter operation may be performed during the overlapping time.

When transmit control signal TS and the conversion gain signal CGS are transitioned from a high level to a low level, the first sampling control signal SPS1 may be transitioned from a low level to a high level, and maintain a high level during the first settling time ST1. In this case, an auto-zero AZ that controls the ADC circuit 150 to remove offset of an amplifier included therein may be transitioned from a low level to a high level, and may maintain a high level during the first auto-zero signal AZ1. In some embodiments, at least some of the first settling time ST1 and the first auto-zero signal AZ1 may overlap each other.

In addition, during the first settling time ST1 in which the first sampling control signal SPS1 maintains a high level, the select signal SEL may be at a high level, the select transistor SX may be turned on, and a reset signal HRST corresponding to the charge according to the reset operation sampled in the first capacitor C1 may be output via the column line CL. In other words, the reset signal HRST in the high conversion gain mode may be output via the column line CL.

After the first sampling transistor SPX1 is turned on, the ramp signal RAMP may be generated to decrease (or increase) at a constant slope during a first time T1. The CDS circuit 160 may compare the ramp signal RAMP to the reset signal HRST in the high conversion gain mode during the first time T1 in which a voltage level of the ramp signal RAMP changes continuously.

After the first settling time ST1 has passed and the first sampling control signal SPS1 has transitioned from a high level to a low level, the second sampling control signal SPS2 may be transitioned from a low level to a high level, and maintain a high level during a second settling time ST2. In this case, during the second settling time ST2 in which the second sampling control signal SPS2 maintains a high level, the select signal SEL may be at a high level, the select transistor SX may be turned on, and an image signal HSIG corresponding to the charge according to the integration operation sampled in the second capacitor C2 may be output via the column line CL. In other words, the image signal HSIG in the high conversion gain mode may be output via the column line CL.

After the second sampling transistor SPX2 is turned on, the ramp signal RAMP may be generated to decrease (or increase) at a constant slope during a second time T2. The CDS circuit 160 may compare the ramp signal RAMP to the image signal HSIG in the high conversion gain mode during the second time T2 in which a voltage level of the ramp signal RAMP changes continuously.

After the second settling time ST2 has passed and the second sampling control signal SPS2 has transitioned from a high level to a low level, the third sampling control signal SPS3 may be transitioned from a low level to a high level, and maintain a high level during the third settling time ST3. In this case, the auto-zero signal AZ may also be transitioned from a low level to a high level, and maintain a high level during a second auto-zero signal AZ2. The select transistor SX may be turned on, and the image signal LSIG corresponding to the charge according to the integration operation sampled by the third capacitor C3 may be output via the column line CL. In other words, the image signal LSIG in the low conversion gain mode may be output via the column line CL.

Thereafter, the conversion gain signal CGS may be transitioned from a low level to a high level, and may maintain a high level during a fourth time LT4. In addition, the first pre-charge select control signal PSEL1 and the second pre-charge select control signal PSEL2 may be transitioned from a low level to a high level, the first pre-charge select control signal PSEL1 may maintain a high level during a second time T12, and the second pre-charge select control signal PSEL2 may maintain a high level during a second time T22. In some embodiments, the fourth time LT4, the second time T12, and the second time T22 may overlap each other.

As the conversion gain signal CGS and the reset control signal RS maintain a high level, the floating diffusion node FD may be reset. Thereafter, the conversion gain signal CGS may be transitioned to a low level. In addition, the select signal SEL may be at a high level during the second time T12 and the second time T22 in which the first pre-charge select control signal PSEL1 and the second pre-charge select control signal PSEL2 are at a high level, the select transistor SX may be turned on, and the reset signal LRST corresponding to the charge of the reset floating diffusion node FD may be output via the column line CL. In other words, the reset signal LRST in the low conversion gain mode may be output via the column line CL.

Figure 15:
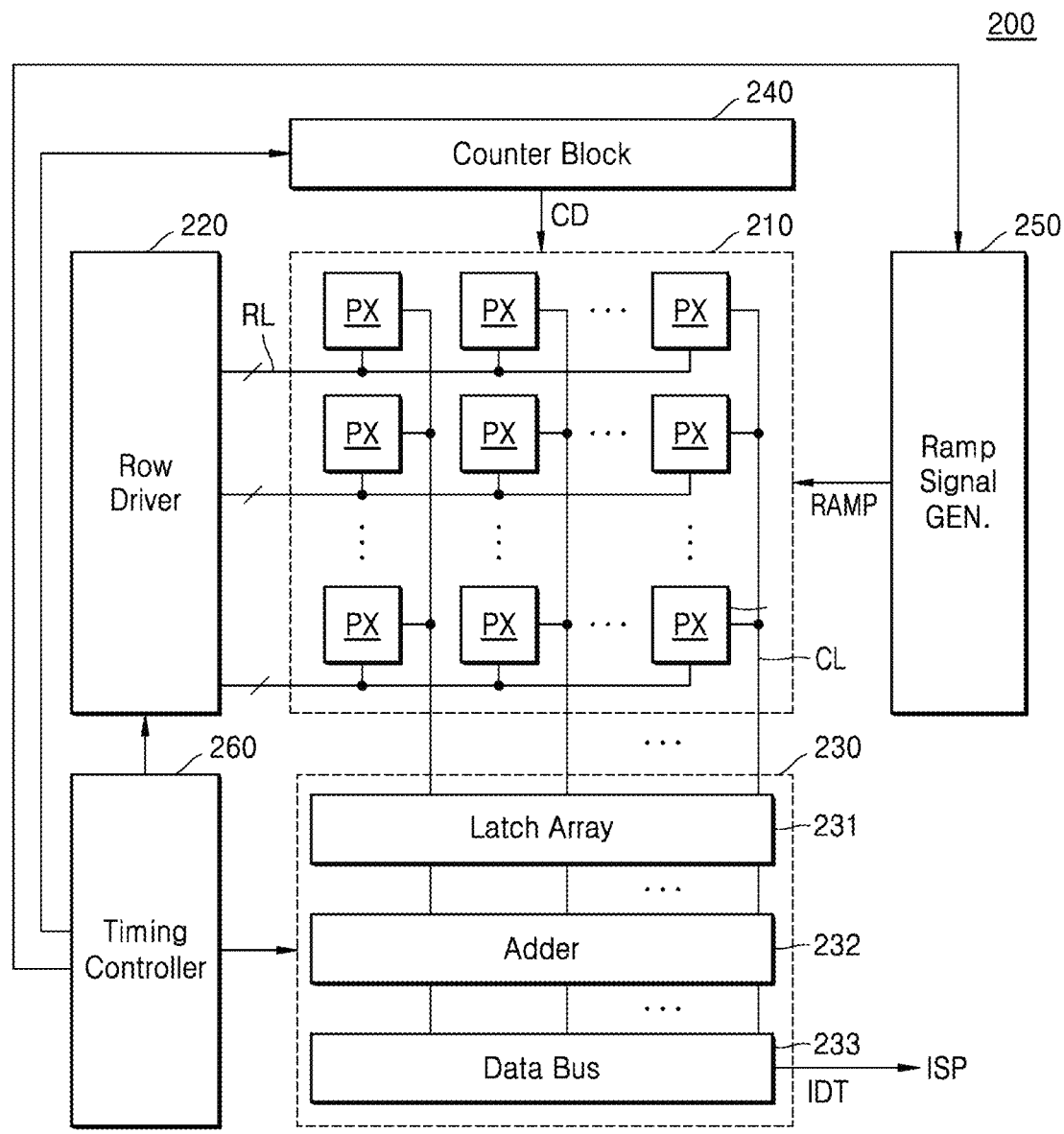
FIG. 15 is a block diagram of an image sensor, according to at least one example embodiment of the inventive concepts.

FIG. 15 is a block diagram of an image sensor 200, according to at least one example embodiment of the inventive concepts. FIG. 15 is a block diagram illustrating a modifiable embodiment of the image sensor 100 of FIG. 1. In the descriptions with reference to FIG. 15, duplicate descriptions with reference to FIG. 1 are omitted.

Referring to FIG. 15, the image sensor 200 may include a pixel array 210, a row driver 220, a read-out circuit 230, a counter block 240, a ramp signal generator 250, and a timing controller 260. The read-out circuit 230 may include a latch array 231, an adder 232, and a data bus 233.

The pixel array 210 may be connected to the plurality of row lines RL, and the plurality of column lines CL, and may include the plurality of pixels PX arranged in an array.

The row driver 220 may drive the pixel array 210, by providing control signals to each of the plurality of pixels PX of the pixel array 210 via the plurality of row lines RL.

The counter block 240 may generate a counting code CD, and provide the generated counting code CD to the plurality of pixels PX. The counting code CD may include, for example a gray code. For example, the counter block 240 may include a plurality of counters respectively corresponding to the plurality of columns of the pixel array 210, and each of the plurality of counters may generate the counting code CD and provide the counting code CD to the pixels PX included in the corresponding column. In response to a counting enable signal, each of the plurality of counters may count the number of clock signals and generate the counting code CD.

The ramp signal generator 250 may generate the ramp signal RAMP, and provide the ramp signal RAMP to each of the plurality of pixels PX.

The pixel array 210 may generate and store the reset value and a sensing value per pixel PX based on the control signals received from the row driver 220, the counting code CD received from the counting block 240, and the ramp signal RAMP received from the ramp signal generator 250, and in addition, may transmit the reset value and the sensing value per row to the read-out circuit 230.

The latch array 231 may store a plurality of reset values and a plurality of sensing values received per row from the pixel array 210. The adder 232 may receive the plurality of reset values and the plurality of sensing values from the latch array 231, and generate the plurality of pixel values per row based on the plurality of reset values and the plurality of sensing values. The adder 232 may include a plurality of adders corresponding to the plurality of columns, and each of the plurality of adders may add corresponding reset values and sensing values to generate the pixel value. The plurality of pixel values may be output as the image data IDT via the data bus 233. For example, the image data IDT may be provided to an image signal processor ISP.

Figure 16:
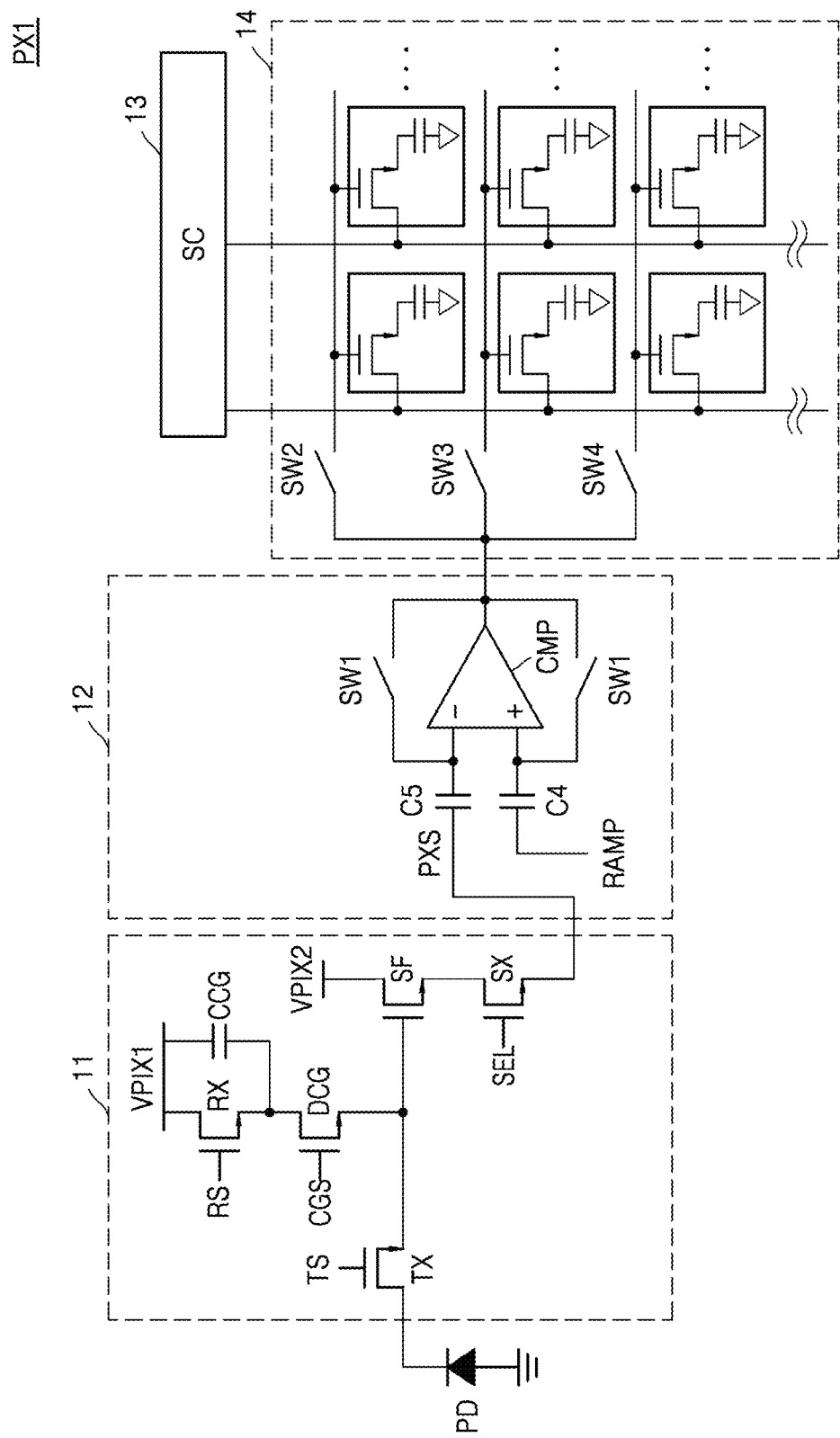
FIG. 16 is a circuit diagram of a pixel, according to at least one example embodiment of the inventive concepts.

FIG. 16 is a circuit diagram of a pixel, according to at least one example embodiment of the inventive concepts. FIG. 16 is a circuit diagram of a pixel PX1, according to at least one example embodiment of the inventive concepts. The pixel PX1 of FIG. 16 may correspond to the pixel PX of FIG. 15.

Referring to FIG. 16, the pixel PX1 may include the photodiode PD, a pixel signal generating circuit 11, an ADC circuit 12, a sampling circuit (SC) 13, and a memory 14. Control signals, such as TS, RS, CGS, and SEL, may be applied to the pixel signal generating circuit 11, and at least some of the control signals may be generated by the row driver 220.

The pixel signal generator 11 pixel signal generating circuit 11 may include a plurality of transistors, such as TX, DCG, RX, SF, and SX, and the conversion gain capacitor CCG. A first terminal of the transmit transistor TX may be connected to an output terminal of the photodiode PD, and a second terminal of the transmit transistor TX may be connected to the floating diffusion node FD. The first terminal of the conversion gain transistor DCG may be connected to the floating diffusion node FD, and the second terminal of the conversion gain transistor DCG may be connected to the reset transistor RX. The first terminal of the reset transistor RX may be connected to the conversion gain transistor DCG, and the first pixel voltage VPIX1 may be applied to the second terminal of the reset transistor RX. The conversion gain capacitor CCG may be connected to the reset transistor RX in parallel. The second pixel voltage VPIX2 may be applied to a first terminal of a source follower SF, and the select transistor SX may be connected to a second terminal of the source follower SF. The first terminal of the select transistor SX may be connected to the source follower SF, and the second terminal of the select transistor SX may be connected to the column line CL.

The pixel signal generating circuit 11 may operate base on the control signals, such as TS, RS, CGS, and SEL output by the row driver 220. The transmit transistor TX may transmit the photocharge from the photodiode PD to the floating diffusion node FD according to the transmit control signal TS. According to a potential of the photocharge stored in the floating diffusion node FD, the source follower SF may amplify the photocharge and output the amplified photocharge via the select transistor SX. When the select transistor SX is turned on in response to the select control signal SEL, a sensing signal, that is, a photosensing signal corresponding to a voltage level of the floating diffusion node FD may be output as the pixel signal PXS, for example, a pixel voltage.

The conversion gain transistor DCG may change capacitance of the floating diffusion node FD according to the conversion gain signal CGS. Because the capacitance is increased when the conversion gain transistor DCG is turned on, the pixel signal generating circuit 11 may operate in the low conversion gain mode. On the other hand, because the capacitance is decreased when the conversion gain transistor DCG is turned off, the pixel signal generating circuit 11 may operate in the high conversion gain mode.

When the reset transistor RX is turned on according to the reset transistor RX, and the conversion gain transistor DCG is turned on according to the conversion gain signal CGS, the floating diffusion node FD may be reset based on the first pixel voltage VPIX1. In this case, the reset signal corresponding to the voltage level of the floating diffusion node FD, for example, a noise signal, may be output as the pixel signal PXS that is an analog signal.

The ADC circuit 12 may convert the pixel signal PXS to a digital value. The ADC circuit 12 may convert the reset signal received as the pixel signal PXS and the image signal received as the pixel signal PXS to the reset value and an image value, which are digital signals, respectively.

The pixel values generated by the plurality of pixels PX1 may have deviations due to inherent characteristics of each pixel value and/or deviations due to differences between characteristics of a logic for outputting the pixel signal. To compensate for deviations between pixel values, a correlated double sampling may be performed in which a reset component, for example, a reset signal, output as the pixel signal PXS, and an image component, for example, an image signal, are obtained from each of the plurality of pixels PX1, and a difference therebetween is extracted as an effective signal component. As the reset value and the image value generated by the ADC circuit 12 are transmitted to the read-out circuit 230, and the read-out circuit 230 calculates the difference between the reset value and the sensing value as the pixel value, the correlated double sampling may be applied.

The ADC circuit 12 may include a comparator CMP, a fourth capacitor C4, a fifth capacitor C5, and a plurality of switches SW1. The comparator CMP may compare the ramp signal RAMP to the pixel signal PXS received from the ramp signal generator 250. The fourth capacitor C4 and the fifth capacitor C5 may integrate the pixel signal PXS and the ramp signal RAMP, respectively. The plurality of switches SW1 may be connected to a feedback line connecting an input terminal to an output terminal of the comparator CMP, and may remove offset of the comparator CMP.

The SC 13 may sample the counting code CD received from the counter block 240 based on a comparison result received from the comparator CMP. In this manner, the reset value and the image value may be generated.

The memory 14 may store (or hold) the reset value and the image value. The memory 14 may include a low conversion gain image memory (or called a first memory), a high conversion gain reset memory (or called a second memory), and a high conversion gain image memory (or called a third memory). An image value corresponding to the low conversion gain mode may be stored in the first memory, a reset value corresponding to the high conversion gain mode may be stored in the second memory, and an image value corresponding to the high conversion gain mode may be stored in the third memory. The memory 14 may be implemented as a volatile memory such as dynamic random access memory (RAM) (DRAM) and static RAM (SRAM). However, the embodiment is not limited thereto, and the memory 14 may be implemented as one of storage elements of various types such as a non-volatile memory, a latch, and a register.

Figure 17:
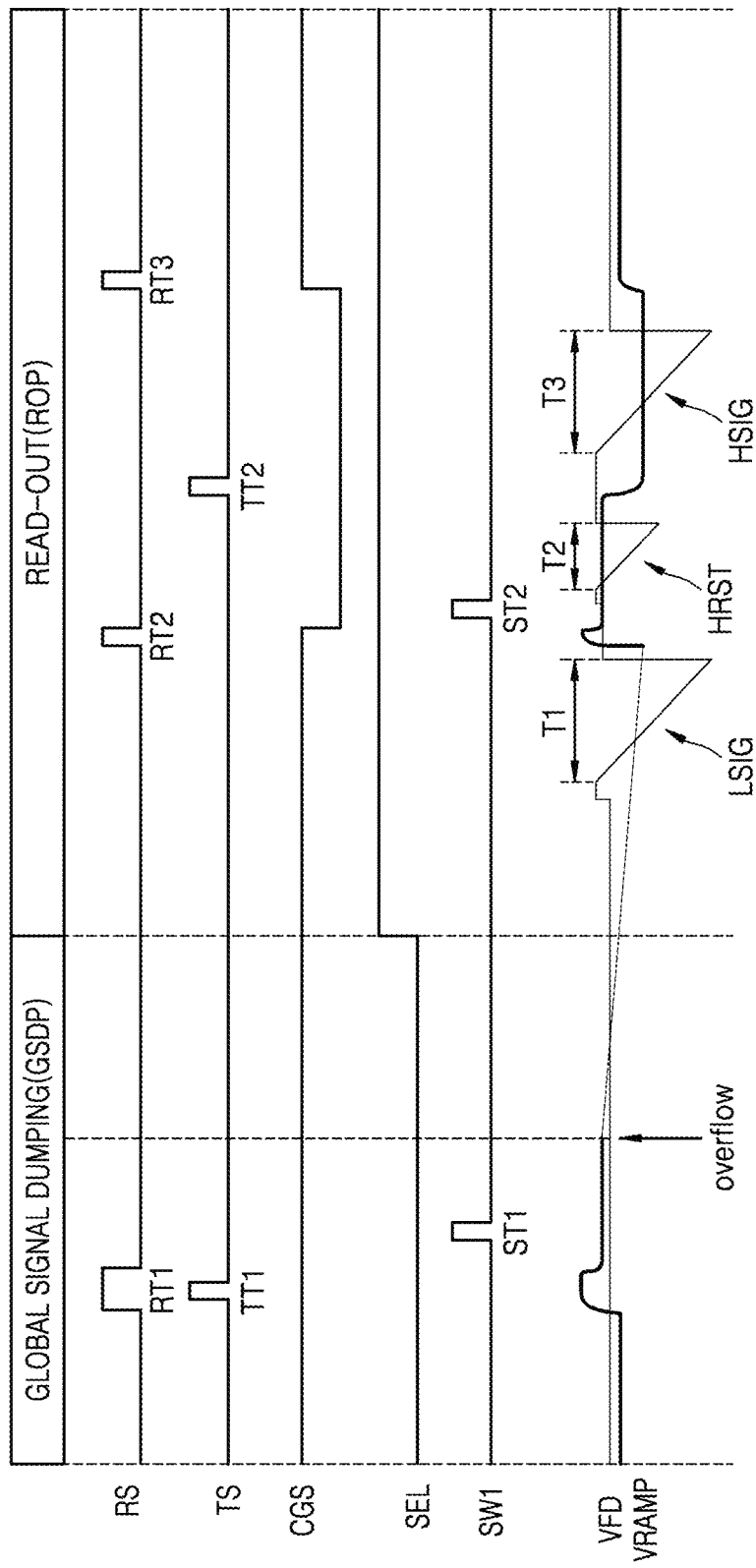
FIG. 17 is a timing diagram illustrating control signals and ramp signals provided to a pixel, according to at least one example embodiment of the inventive concepts.

FIG. 17 is a timing diagram illustrating control signals and ramp signals provided to a pixel, according to at least one example embodiment of the inventive concepts. FIG. 17 is a timing diagram illustrating the control signals and the ramp signals, that are provided to the pixel PX1 of FIG. 16.

Referring to FIG. 17, operations described below may be performed in the global signal dumping period GSDP. Throughout the global signal dumping period GSDP, the conversion gain signal CGS may maintain a high level, and the select signal SEL may maintain a low level. In this case, the reset control signal RS may be transitioned to a high level, and maintain a high level during the first reset time RT1. In addition, the transmit control signal TS may be transitioned to a high level, and maintain a high level during the first transmit time TT1. In some embodiments, the first reset time RT1 and the first transmit time TT1 may overlap each other, and the shutter operation may be performed during the overlapping period.

Thereafter, the reset control signal RS and the transmit control signal TS may be transitioned to a low level. Thereafter, to remove offset of the comparator CMP, the plurality of switches SW1 may be turned on during a first time ST1 and then turned off. In a high illuminance environment, an overflow phenomenon may occur in which some of the charge in the photodiode PD flows into the floating diffusion node FD. The overflowed charge may be integrated in the conversion gain capacitor CCG.

The operations described below may be performed during the read-out period ROP. Throughout the read-out period ROP, the select signal SEL may maintain a high level. In this case, the conversion gain signal CGS may also maintain a high level. In other words, the pixel PX1 may operate in the low conversion gain mode. The select transistor SX may be turned on, and the image signal LSIG corresponding to the overflowed charge that is sampled by the conversion gain capacitor CCG may be output via the column line CL. In other words, the image signal LSIG in the low conversion gain mode may be output via the column line CL.

The ramp signal RAMP may be generated to decrease (or increase) at a constant slope during the first time T1. During the first time T1 in which the voltage level of the ramp signal RAMP changes continuously, the ADC circuit 12 may compare the ramp signal RAMP to the image signal LSIG in the low conversion gain mode. And, the comparison result may be stored in the first memory of the memory 14.

Thereafter, the reset control signal RS may be transitioned to a high level, and maintain a high level during the second reset time RT2. In this case, the conversion gain signal CGS may also maintain a high level. Accordingly, the floating diffusion node FD may be reset. And the conversion gain signal CGS may be transitioned to a low level. In other words, the pixel PX1 may operate in the high conversion gain mode. The plurality of switches SW1 may be turned on during a second time ST2, and then turned off.

Because the select signal SEL maintains a high level, the select transistor SX may be turned on, and the reset signal HRST corresponding to the charge of the reset floating diffusion node FD may be output via the column line CL. In other words, the reset signal HRST in the high conversion gain mode may be output via the column line CL.

The ramp signal RAMP may be generated to decrease (or increase) at a constant slope during the second time T2. The ADC circuit 12 may compare the ramp signal RAMP to the reset signal HRST in the high conversion gain mode during the second time T2 in which a voltage level of the ramp signal RAMP changes continuously. And, the comparison result may be stored in the first memory of the second memory.

Thereafter, the transmit control signal TS may be transitioned to a high level, and maintain a high level during the second transmit time TT2. In this case, the conversion gain signal CGS may also maintain a low level. The charge of the photodiode PD may be integrated in the floating diffusion node FD.

Because the select signal SEL maintains a high level, the select transistor SX may be turned on, and the image signal HSIG corresponding to the charge of the integrated floating diffusion node FD may be output via the column line CL. In other words, the image signal HSIG in the high conversion gain mode may be output via the column line CL.

The ramp signal RAMP may be generated to decrease (or increase) at a constant slope during the third time T3. The ADC circuit 12 may compare the ramp signal RAMP to the image signal HSIG in the high conversion gain mode during the third time T3 in which a voltage level of the ramp signal RAMP changes continuously. And, the comparison result may be stored in the first memory of the third memory.

Thereafter, the reset control signal RS may be transitioned to a high level, and maintain a high level during the third reset time RT3. In this case, the conversion gain signal CGS may also be transitioned to a high level. Accordingly, the floating diffusion node FD and the conversion gain capacitor CCG may be reset.

In this manner, the image sensor 200 according to at least one example embodiment of the inventive concepts may additionally include a capacitor integrating the overflowed charge to the floating diffusion node, and perform a dual conversion gain operation based on the added capacitor. Accordingly, the image sensor 200 may expand a dynamic ranged.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image sensor comprising:
   a pixel array including a plurality of pixels; and
   a row driver connected to the pixel array,
   wherein each of the plurality of pixels comprises,
      a photodiode;
      a transmit transistor connected between the photodiode and a floating diffusion;
      a first source follower connected between the floating diffusion and a first node, the first source follower configured to,
         amplify a voltage of the floating diffusion, and
         output the amplified voltage to the first node;
      a first pre-charge select transistor connected to the first node and a second node, the first pre-charge select transistor configured to reset the first node based on a signal from the row driver;
      a first capacitor and a second capacitor,
      a first sampling transistor connected between the second node and the first capacitor, the first sampling transistor configured to cause the first capacitor to sample the voltage of the floating diffusion; and
      a second sampling transistor connected between the second node and the second capacitor, the second sampling transistor configured to cause the second capacitor to sample the voltage of the floating diffusion; and
   wherein the row driver is further configured to control each of the plurality of pixels such that the first capacitor and the second capacitor share charge corresponding to the amplified voltage during a first period.

2. The image sensor of claim 1,
   wherein the row driver is configured to turn on the first sampling transistor and the second sampling transistor during the first period.

3. The image sensor of claim 2, wherein each of the plurality of pixels further comprises:
   a second pre-charge select transistor configured to reset the first node.

4. The image sensor of claim 2, wherein the row driver is configured to:
   turn on the first sampling transistor and turn off the second sampling transistor during a second period.

5. The image sensor of claim 4, wherein the row driver is configured to:
   turn off the first sampling transistor and turn on the second sampling transistor during a third period.

6. The image sensor of claim 2, wherein each of the plurality of pixels further comprises:

a second source follower configured to amplify a voltage of the second node.

7. The image sensor of claim 1, wherein each of the plurality of pixels further comprises a reset transistor configured to reset the floating diffusion; and the row driver is configured to control each of the plurality of pixels such that the first capacitor stores charge corresponding to the amplified voltage in response to the floating diffusion being reset.

8. The image sensor of claim 1, wherein the row driver is configured to:

control each of the plurality of pixels such that the second capacitor stores charges corresponding to the amplified voltage in response to the floating diffusion storing charges received from the photodiode through the transmit transistor.

9. The image sensor of claim 1, wherein each of the plurality of pixels further comprises:

a pre-charge transistor configured to pre-charge the first node.

10. The image sensor of claim 9, wherein each of the plurality of pixels further comprises:

a second pre-charge select transistor connected between the first node and the pre-charge transistor.

11. The image sensor of claim 10, wherein the pre-charge transistor is connected to a ground node.

12. The image sensor of claim 9, wherein each of the plurality of pixels further comprises:

a second pre-charge select transistor connected between the pre-charge transistor and a ground node.

13. The image sensor of claim 12, wherein the pre-charge transistor is connected between the first node and the second pre-charge select transistor.

14. The image sensor of claim 3, wherein the second pre-charge select transistor is further configured to reset the second node.

15. The image sensor of claim 1, wherein each of the plurality of pixels further comprises:

a second pre-charge select transistor connected between the first source follower and the first node.

16. The image sensor of claim 15, wherein each of the plurality of pixels further comprises:

a pre-charge transistor connected to the first node and a ground node.

\* \* \* \* \*